US011878771B2

(12) United States Patent
Martin et al.

(10) Patent No.: US 11,878,771 B2
(45) Date of Patent: Jan. 23, 2024

(54) BI-DIRECTIONAL FOIL SYSTEM FOR TOWED MARINE CABLE ARRAY

(71) Applicant: Ion Geophysical Corporation, Houston, TX (US)

(72) Inventors: Erin Martin, Ontario (CA); Daniel George Martin, Ontario (CA)

(73) Assignee: DigiCourse, LLC, Harahan, LA (US)

( * ) Notice: Subject to any disclaimer, the term of this patent is extended or adjusted under 35 U.S.C. 154(b) by 0 days.

(21) Appl. No.: 17/119,434

(22) Filed: Dec. 11, 2020

(65) Prior Publication Data
US 2021/0197929 A1 Jul. 1, 2021

Related U.S. Application Data

(60) Provisional application No. 62/955,851, filed on Dec. 31, 2019.

(51) Int. Cl.
*B63B 21/66* (2006.01)
*B63B 1/26* (2006.01)

(52) U.S. Cl.
CPC ............... *B63B 21/66* (2013.01); *B63B 1/26* (2013.01)

(58) Field of Classification Search
CPC .. B63B 1/00; B63B 1/26; B63B 21/00; B63B 21/66; B63B 35/00; G01V 1/3808; G01V 1/3826
USPC ........................................................ 114/253
See application file for complete search history.

(56) References Cited

U.S. PATENT DOCUMENTS

| 10,488,541 | B2 * | 11/2019 | Schneider | ............... B63B 21/66 |
| 2017/0233040 | A1 | 8/2017 | Martin | |
| 2018/0027784 | A1 | 2/2018 | Martin | |
| 2019/0302300 | A1 | 10/2019 | Martin | |
| 2020/0108898 | A1 | 4/2020 | Martin | |

OTHER PUBLICATIONS

PCT Notification of Transmittal of the International Search Report and the Written Opinion of the International Searching Authority, or the Declaration for Application No. PCT/US2020/064578 dated May 31, 2021.

\* cited by examiner

*Primary Examiner* — Lars A Olson
(74) *Attorney, Agent, or Firm* — Haynes and Boone, LLP

(57) ABSTRACT

A foil system is used with a towed marine cable array to provide downward, upward or lateral lift to the array. The foil system can be coupled with the cable and configured to bias the submerged payload toward a target position. The foil system can include a group of foil sections each having a leading edge collectively defining an angle of attack, and a group of through-cables supporting the group of foil sections within the foil system. A subset of through-cables of the group of through-cables are arranged through front halves of the group of foil sections. This subset of through-cables can be selectively tensionable, and manipulatable to define a tensioned one of the subset of through-cables as being offset from a chord that is defined between the leading edge and a trailing edge of any of the foil sections. The foil system can thus induce one or more angles of attack for the group of foil sections, based on a rotational constraint defined by the tensioned one of the through-cables.

40 Claims, 16 Drawing Sheets

BI-DIRECTIONAL FOIL SYSTEM FOR TOWED MARINE CABLE ARRAY

CROSS-REFERENCE TO RELATED APPLICATIONS

This application claims the benefit of U.S. Provisional Application No. 62/955,851 filed on Dec. 31, 2019, which is incorporated herein by reference in its entirety and to which priority is claimed.

FIELD

The described embodiments relate generally to towed marine cable arrays. More particularly, the present embodiments relate to controlling hydrodynamic foil orientation in the marine cable array.

BACKGROUND

In towed marine seismic exploration, a hydrophone array is typically towed behind a marine vessel near the sea surface. The hydrophones are mounted to multiple sensor cables, commonly referred to as streamers. The streamers serve as platforms or carriers for the hydrophones, which are distributed along the length of each streamer in the array.

A set of seismic sources, also towed near the sea surface, are operated to periodically emit acoustic energy. The acoustic energy of interest propagates downward through the seawater (or other water column), penetrates the ocean floor, reflects from the subsea strata and other underlying structures, and returns upward through the water column to the hydrophone array.

The reflected seismic energy (or acoustic wave energy) arrives at receiver points in the towed hydrophone array. The array includes many such receiver points, distributed along each of the streamer cables, with sensors configured to generate data records characterizing the upward-traveling acoustic wavelets (or seismic waves) received from the subsurface structures beneath the seabed, at each of the receiver points. The hydrophone data recordings are later processed to generate seismic images of the underlying structure.

In the field of subsea seismic exploration, there has recently been a demand for seismic equipment operators to conduct their surveys with the seismic equipment submerged below the depths at which most seismic surveys have been conducted in the past. These new, deeper operating targets can now lie well below the depth of the surface-referenced equipment (i.e., the vessel and the paravanes) that is used to tow and laterally spread the seismic sensors.

Typical foil-shaped marine depressors for maintaining equipment at a substantially constant submerged depth tend to be fairly small with very poor aspect ratios, thus resulting in low lift. Aspect ratio is defined as the span of the depressor divided by its chord line length. Depressors with high aspect ratios generate high downward lift forces for minimal drag (such that lift-to-drag ratios as high as 10:1 or more are possible), whereas depressors with aspect ratios as low as 1 or 2 (i.e., where span and chord are roughly the same scale) will typically have lift-to-drag ratios as low as 2:1, or even lower. Conventional depressors often also provide payload bays which can be used to hold additional ballast to supplement the downward force generated by the depressor.

The problem with using deadweight to generate downforce is that it does not scale with tow speed-it provides a constant downforce regardless of how fast the depressor is moving through the water. This is often disadvantageous for those applications where a range of operational speeds is expected, with the requirement that the towed equipment maintain a stable depth over that speed range. Consequently, there is no easy, economical, or ideal way to submerge and operate seismic equipment, such as towed streamer cables, at the desired lower depths.

The information included in this Background section of the specification, including any references cited herein and any description or discussion thereof, is included for technical reference purposes only and is not to be regarded subject matter by which the scope of the invention as defined in the claims is to be bound.

SUMMARY

Embodiments of the present invention are directed to controlling an angle of attack for submerged foils attached to a towed marine cable array. Foil sections can be coupled to one another by a group of through-cables. A subset of the group of through-cables is arranged through front halves of the foil sections. One or more actuators can generally manipulate the subset of through-cables in order to induce a first angle of attack, a second angle of attack, and/or maintain the foils at a substantially neutral angle of attack. As described in greater detail herein, this can include having three through-cables (e.g., a subset of through-cables) arranged in front halves of substantially symmetrical foil sections, and a fourth arranged in back halves of the foil sections. Selecting a tensioned one of the three through-cables can define a rotational constraint above, below, and/or in-line with a foil chord for inducing the respective angle of attack. In some cases, selective tensioning can occur in this manner while at least a portion of the array is submerged in a marine environment, allowing for on-the-fly adjustments to the foil system during operation.

While various embodiments are disclosed, one exemplary embodiment of a towed marine cable array is disclosed. The towed marine cable array includes a cable configured to be towed by a vessel and carry a submerged payload through a marine environment. The towed marine cable array further includes a foil system coupled with the cable and configured to bias the submerged payload toward a target position. The foil system includes a group of foil sections each having a leading edge collectively defining an angle of attack. The foil system further includes a group of through-cables supporting the group of foil sections within the foil system. A subset of through-cables of the group of through-cables are arranged through front halves of the group of foil sections. The subset of through-cables of the group of through-cables are further selectively tensionable. The subset of through-cables of the group of through-cables are manipulable to define a tensioned one of the subset of through-cables as being offset from a chord that is defined between the leading edge and a trailing edge of any of the foil sections.

In another embodiment, the towed marine cable array can further include an actuator operatively coupled with the subset of through-cables and configured to alter a tension in one or more through-cables of the subset of through-cables. Additionally or alternatively, the actuator can be a first actuator. In this regard, the towed marine cable array can further include a second actuator operatively coupled with the subset of through-cables and configured to manipulate the tensioned through-cable into an arrangement that rotationally constrains the front halves relative to back halves of the group of foil sections.

In another embodiment, the subset of through-cables can include a group of leading edge through-cables each extending through the front halves of the group of foil sections and along the leading edge. The subset of through-cables can further include a trailing edge through-cable arranged through back halves of the group of foil sections and along the trailing edge. A first leading edge through-cable of the group of leading edge through-cables and the trailing edge through-cable can also be arranged substantially along the chord.

In another embodiment, a second leading edge through-cable can be arranged above the chord. Further, a third leading edge through-cable can be arranged below the chord. In this regard, in a first configuration, the tensioned through-cable is the second leading edge through-cable. Further, in a second configuration, the tensioned through-cable is the third leading edge through-cable.

In another embodiment, each foil section of the group of foil sections can be substantially symmetrical along the chord. The group of foil sections can exhibit a substantially neutral angle of attack, for example, such as when the tensioned through cable is a cable arranged along the foil chord line, and the second and third through-cables are both in a relaxed state. Alternatively, a non-zero angle of attack can be achieved by transferring tension from the through-cable arranged along the foil chord line to either the through cable arranged above the chord line (to induce a negative angle of attack), or the through-cable lying below the chord line (to induce a positive angle of attack). In this regard, when the tensioned through-cable is offset from the chord, the tensioned through-cable can rotationally constrain the front halves relative to back halves of the group of foil sections to define the angle of attack as a positive or negative angle of attack.

In another embodiment, the foil system can be a first modular foil system. The towed marine cable array can further include a second modular foil system, as described herein. The first and second modular foil systems can be connected to one another within the towed marine cable array. In some cases, the group of through-cables of each of the first and second modular foil systems converge toward a connection point arranged substantially between the first and second modular foil systems.

In another embodiment, the cable can be an upper cable. The towed marine cable array can further include a lower cable. The second modular foil system can be attached to the lower cable. The upper cable and the lower cable can cooperate to form a mouth of a fishing trawl. The first modular foil system and the second modular foil system can be configured to increase a separation distance between the upper cable and the lower cable at the mouth of the fishing trawl.

In some cases, the towed marine cable array can further include a port cable and a starboard cable additionally forming the mouth of the fishing trawl. In this regard, the towed marine cable array can further include a third modular foil system, as described herein, attached to the port cable. Further, the towed marine cable array can also include a fourth modular foil system, as described herein, attached to the starboard cable. The third modular foil system and the fourth modular foil system can be configured to laterally spread the port cable and the starboard cable apart.

In another embodiment, the cable can be a component of a seismic receiver array. In this regard, in some cases, the submerged payload can include seismic sources. The seismic sources can be configured to emit energy into the marine environment.

In another embodiment, the cable can be a separator cable. The towed marine cable array can further include streamer cables configured to be towed behind the separator cable. The submerged payload can include seismic receivers carried by the streamer cables. The angle of attack can be configured to maintain the seismic receivers at a desired depth.

In another embodiment, the cable can be a lateral cable of the towed marine cable array under tension. The lateral cable can include an end portion positioned along an edge of the towed marine cable array. The foil system can be coupled with the lateral cable adjacent to the end portion. In some cases, the towed marine cable array can further include a spur line connected to the end portion of the lateral cable. The foil system can be connected to the spur line opposite the lateral cable.

In another embodiment, a foil system for biasing a cable of a towed marine cable array is disclosed. The foil system includes a foil defining a foil shape having a leading edge and trailing edge. The foil system further includes a first through-cable extending through the foil along the leading edge. The foil system further includes a second through-cable extending through the foil along the trailing edge. The foil system further includes a first actuator configured to tension the first through-cable. The foil system further includes a second actuator configured to move the tensioned first through-cable from an unselected configuration to a selected configuration. When in the unselected configuration, the tensioned first through-cable cooperates with the second through-cable to maintain the foil at a substantially neutral angle of attack. When in the selected configuration, the tensioned first through-cable cooperates with the second through-cable to maintain the foil at a positive or negative angle attack.

In another embodiment, the foil can be substantially symmetrical and define a chord extending between the leading and trailing edges. The tensioned first through-cable can be arranged offset from the chord in the selected configuration. The second actuator can be coupled with the foil and the tensioned first through-cable. The second actuator can be configured to move the tensioned first through-cable from an arrangement substantially along the chord in the unselected configuration to the arrangement offset from the chord in the selected configuration.

In another embodiment, the first through-cable can be a first leading edge through-cable of a group of leading edge through-cables extending through a front half of the foil and along the leading edge. The second actuator can be configured to define one of the group of leading edge through-cables as the tensioned first through-cable.

In some cases, the second actuator can include a selector wheel. Each of the group of leading edge through-cables can be fixed to the selector wheel at circumferentially spaced positions from one another. A rotational position of the selector wheel can define which of the group of leading edge through-cables is the tensioned first through-cable. The rotational position of the selector wheel can be adjustable while the foil system is submerged in a marine environment.

In another embodiment, the front half of the foil includes a first duct, a second duct, and a third duct. Each of the first duct, the second duct, and the third duct can be configured to receive a respective one of the leading edge through-cable of the group of leading edge through-cables. The foil can further define a back half having a fourth duct configured to receive the second through-cable. Each of the first duct, second duct, third duct, and fourth duct can extend completely through a width of the foil and arranged substantially parallel to one another.

In another embodiment, the first through-cable and the second through-cable can converge toward connection points adjacent to opposing ends of the foil. In some cases, each of the connection points can be configured to couple to a pair of through-cables from another foil system of the towed marine cable array to the first and second through-cables.

In another embodiment, a method of positioning a foil system in a towed marine cable array is disclosed. The method includes launching an array into a marine environment. The array can include a cable configured to carry a submerged payload and a foil system coupled to the cable. The foil system can include a group of foil sections that each define front and back halves and that are connected to one another by a group of through-cables extending therethrough. The method further includes tensioning a first of one or more through-cables of the group of through-cables to define a first rotational constraint of the front halves relative to the back halves, thereby inducing a first angle of attack. The method further includes, optionally alternatively, tensioning a second of the one or more through-cables of the group of through-cables to define a second rotational constraint of the front halves relative to the back halves, thereby inducing a second angle of attack. A tensioned one of the group of through-cables during either of the tensioning operations is offset from a chord defined between a leading and a trailing edge of any of the foil sections.

In another embodiment, the method can further include acquiring submerged positional data associated with the foil system. The method can further include determining an adjustment parameter for the foil system by comparing the submerged positional data with an operational target. In some cases, the operation of inducing the first angle of attack or the operation of inducing the second angle of attack can be based on the adjustment parameter.

In another embodiment, the foil system can further include a dynamic actuator configured to cause either of the tensioning operations while the array is submerged in the marine environment using the adjustment parameter.

In another embodiment, one of the first or the second angles of attack can be a substantially neutral angle of attack. Each of the group of foil sections can include a substantially symmetrical foil.

In another embodiment, the group of through-cables can include a group of leading edge through-cables. Each of the group of through-cables can be separated from one another and extend through first halves of the group of foil sections along leading edges of the group of foil sections. In some cases, one of the tensioning operations can define a first leading edge through-cable of the group of leading edge through-cables as the tensioned one of the group of leading edge through-cables. In this regard, another of the tensioning operations can define a second leading edge through-cable of the group of leading edge through-cables as the tensioned one of the group of leading edge through-cables.

In another embodiment, the method can further include tensioning a third of the one or more through-cables, wherein the third leading edge through-cable is arranged substantially along the chord. The array can be a seismic array, one or more components of a fishing trawl, or another appropriate marine system. Accordingly, the seismic array can include seismic sources and seismic receivers that cooperate with one another to produce geological data. In this regard, the methods described herein can be used to induce the first or second angle of attack for components associated with one or both of the seismic sources or seismic receivers, as may be appropriate for a given application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

The disclosure will be readily understood by the following detailed description in conjunction with the accompanying drawings, wherein like reference numerals designate like structural elements.

Figure 1A:
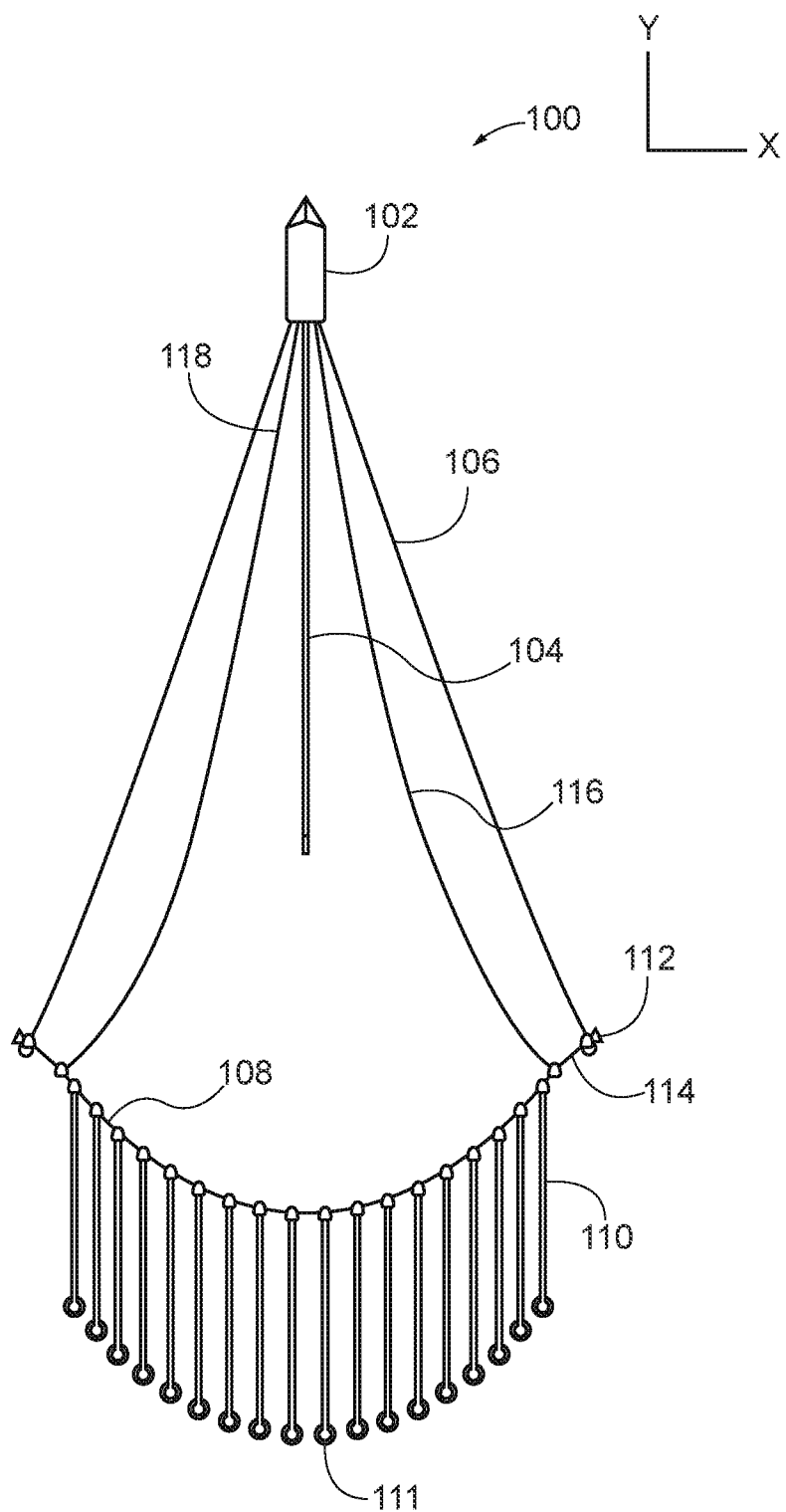
FIG. 1A depicts a top plan view of a schematic illustration of a first example of a towed marine cable array.

The use of cross-hatching or shading in the accompanying figures is generally provided to clarify the boundaries between adjacent elements, e.g., when shown in cross section, and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure can be practiced in a variety of forms in addition to those described herein.

The present disclosure describes systems, devices, and techniques related to controlling an orientation of one or more foil systems of a towed marine cable array. Such foil systems can be used to control movements and/or maintain a position of various instruments, devices, assemblies, and so forth of the towed marine cable array. For example, a foil system can include a group of foil sections that cooperate to define a foil shape having a leading edge and a trailing edge. The group of foil sections can be coupled to instruments of the array. When towed, the group of foil sections can generate lift (e.g., including a lateral lift, an upward lift, a downward lift, and so on), due in part to an orientation or "angle of attack" of the foil shape. In turn, this lift can be used to correspondingly move ropes, cables, and instruments coupled to the foil system. The foil sections defining the foil shape can be coupled together by a through-cable and/or other mechanism allowing the foil sections to move relative to one another in a dynamic marine environment. It can be desirable to manipulate the angle of attack defined by the group of foils, for example, to adjust the lift generated by the system in response to marine, operational, and/or other conditions or circumstances.

The foil system of the present disclosure can allow the group of foil sections to be arranged at a variety of orientations. Broadly, a group of through-cables can be used to support a group of foils or foil sections within the system. The through-cables can be specifically arranged to define rotational constraints for inducing a target angle of attack for the foil sections. For example, a trailing edge through-cable can generally extend through a back half of each of the foil sections, and one or more other through-cables can extend through the front half of each of the foil sections. Each of the through-cables (e.g., a subset of the group of through-cables) can be selectively tensioned and/or manipulated in order to control the angle of attack of the foil.

As an illustration, the subset of through-cables can be tensioned and moved from an first selected to a second selected configuration. In each selected configuration, one of the through-cables can be tensioned to define a rotational constraint of the front half of the foil relative to the back half of the foil. The rotational constraint can be tailored to induce a given angle of attack based upon a configuration or position of the selected and tensioned through-cable relative to the trailing edge through-cable. For example, the trailing edge through-cable can be arranged along the chord of the foil that is defined between the leading edge and the trailing edge of the foil. When the selected and tensioned through-cable of the subset of cables in the front half of the foil is positioned along the chord, the foil can exhibit a substantially neutral angle of attack, such similar to the case for substantially symmetrical foil shapes. When the selected and tensioned through-cable of the subset is arranged below or above the chord, the foil can exhibit a non-zero angle of attack.

In an embodiment, the subset of through-cables can include three through-cables, a first leading edge through-cable, a second leading edge through-cable, and a third leading edge through-cable, which can be generally arranged in a front half of the foil or group of foil sections. For a substantially symmetric foil cross-section, the first leading edge through-cable can be positioned generally along the chord of the foil, the second leading edge through-cable can be positioned generally above the chord, and the third leading edge through-cable can be positioned generally below the chord. And as stated above, the trailing edge through-cable can be positioned along the chord and through the back half of the foil. In this regard, the foil can be supported within the array by four cables.

The foil system can include one or more actuators in order to facilitate the selective tensioning and manipulation of the subset of through-cables that are arranged in the front half. For example, the foil system can include a first actuator coupled to one more of the subset of through-cables. The first actuator can be configured to induce a tension in some or all of the subset of through-cables. Imposing a tension distribution across the subset of through-cables in the forward half of the foils that is symmetric with respect to the foil chord line can cause the foils to assume a zero or neutral angle of attack. Alternatively, imposing a tension distribution that is asymmetric with respect to the foil chord line can cause the foils to assume an asymmetric (or non-zero) angle of attack. In this fashion, the tensions of the subset of through-cables can be manipulated or selected in order to define a rotational constraint that achieves a desired angle of attack.

As such, the foil system can also include dedicated actuators for each through-cable in the forward half of the foil section. A set of three actuators can generally be configured to manipulate the subset of through-cables so as to define the rotational constraint of the front half relative to the back half of the foil. For example, the set of actuators can be configured to concentrate the tension through a selected one of the subset of through-cables so that the selected through-cable is used to define the rotational constraint of the front half of the foil relative to the back half of the foil. For example, when the first actuator applies tension on the first leading edge through-cable, the orientation of the foil can be defined by the first leading edge through-cable and the trailing edge through-cable, which are each arranged along the chord, and thus the foil can assume a substantially neutral angle of attack. As another example, when the second actuator applies tension on the second leading edge through-cable, the orientation of the foil can be defined by the second leading edge through-cable and the trailing edge through-cable. When the second leading edge through-cable is positioned above the chord, the foil can assume a negative angle of attack, generating lift in a vertically downward or negative direction. As another example, when the third actuator applies tension on the third leading edge through-cable, the orientation of the foil can be defined by the third leading edge through-cable and the trailing edge through-cable. When the third leading edge through-cable is positioned below the chord, the foil can assume a positive angle of attack, generating lift in a vertically upward or positive direction. In other configurations, other angles of attack can be generated and/or maintained.

It will be appreciated that the embodiments described herein are not limited to a foil system having four through-cables. For example, the described disclosure also encompasses foils being supported by two through-cables within a towed marine cable array. In this arrangement, one or more actuators can operate to define one or more rotational constraints of the front half of the foil relative to the back half of the foil section. As an illustration, the subset of through-cables extending through the front half of the foil can be a single leading edge through-cable. The single leading edge through-cable can be arranged within the foil in a manner such that the cable can rotate or move relative to the chord of the foil. For example, the single leading edge through-cable can be arranged in a guide or cam feature that facilitates movement of the through-cable within the foil. In this manner, the second actuator can be coupled with, or at least partially define, the cam, and cause the single leading edge through-cable to be positioned, when tensioned, along, above, and/or below the chord. As stated above, the trailing edge through-cable can be positioned along the chord and through a back half of the foil section. In this regard, an actuator can be used to induce or maintain a neutral, positive, and/or negative angle of attack based on a position of the single leading edge through-cable. In other embodiments, other arrangements are possible, including those with three, five, six or more cables, and thus discussion of embodiments having two or four through-cables should not be construed as limiting. Additionally, asymmetric foils can also be used in certain applications and as described herein.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Figure 1B:
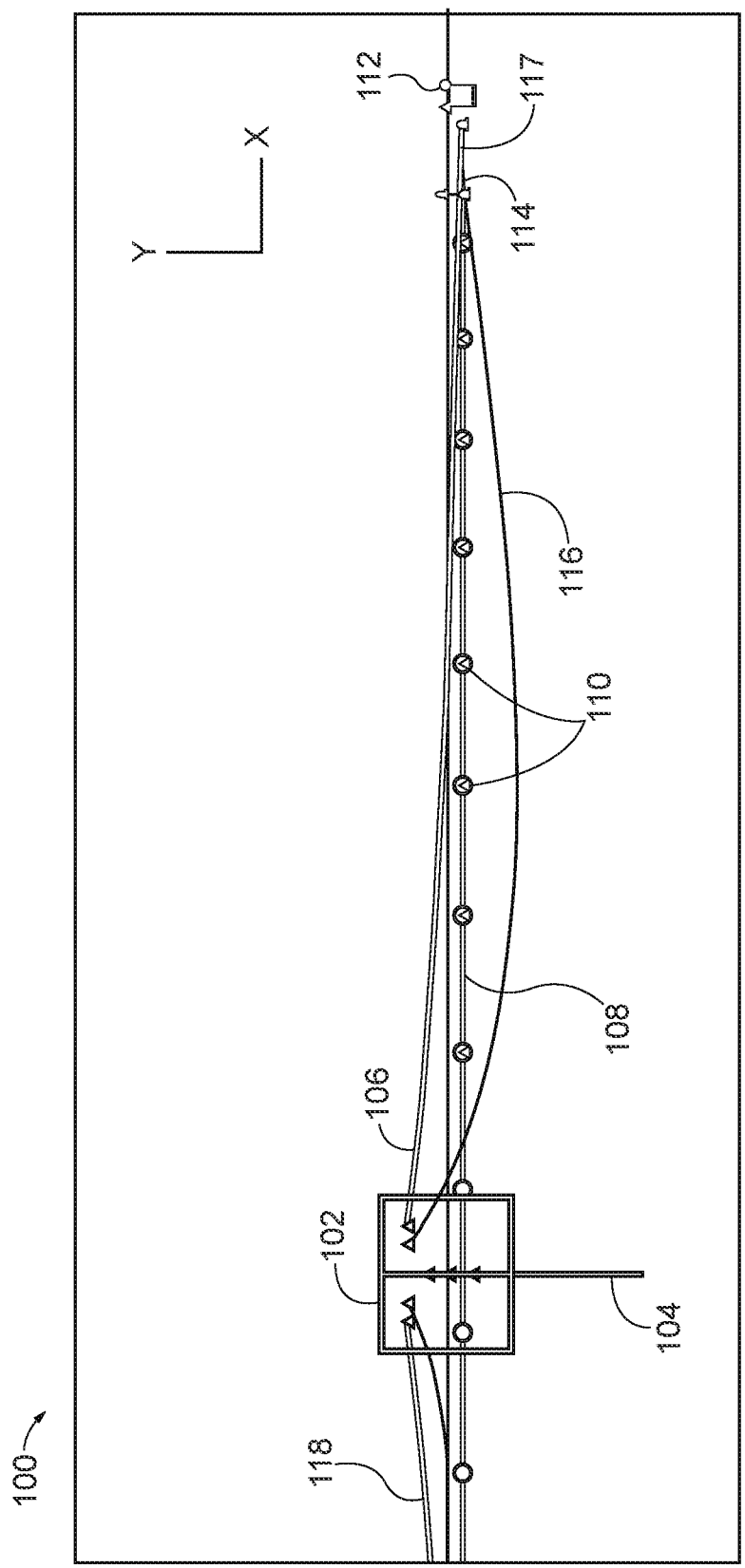
FIG. 1B depicts a rear elevation view of a schematic illustration of the towed marine cable array of FIG. 1A.

One embodiment of a towed three-dimensional, marine seismic array 100 is depicted in FIGS. 1A and 1B. The array 100 can be adapted to use one more of the foil systems such as the ones discussed generally above and described in greater detail below (e.g., including foil system 500 of FIG. 5A, below). With reference to FIG. 1, the array 100 is towed by a marine vessel 102. A number of cables, ropes, or other lines can be attached to the marine vessel 102. For example, an umbilical cable 104 with acoustic signal source generators (e.g., air guns) can trail directly behind the marine vessel 102. A pair of tow ropes 106 or cables can splay out to port and starboard from the stern of the marine vessel 102. A cross-cable 108 can extend between and connect to the tow ropes 106 adjacent to the aft ends of the tow ropes 106. A number of streamer cables 110 can be connected to the cross-cable 108 at a number of locations along the length of the cross-cable 108 between the tow ropes 106. In some embodiments, the streamer cables 110 can be evenly spaced apart from adjacent streamer cables 110 along the length of the cross-cable 108. In a typical embodiment, there can be up to 18 streamer cables 110 and they can be spaced anywhere between 10 m and 100 m or more apart. Respective tail buoys 111 can be affixed to the ends of each of the streamer cables 110 which can aid in maintaining a position of the streamer cables 110, providing a visual marker for the array, and so on.

The cross-cable 108 can extend beyond the port-most and starboard-most streamer cables 110 to attach to the tow ropes 106. These lateral sections of the cross-cable 108 can be referred to as spur lines 114. In some embodiments, the spur lines 114 can be separate ropes or cables that connect to and extend between the lateral ends of the cross-cable 108 and the tow ropes 106.

Paravanes 112 can further be attached to the tow ropes 106 at or adjacent to the connection between the tow ropes 106 and the spur lines 114 on each of the port and starboard sides. The paravanes 112 are winged hydrofoils that move outward in the water in an oblique direction to the direction of travel of the marine vessel 102, thus providing lateral spread to the cross-cable 106 and the streamer cables 110 attached thereto. In other configurations, alternative spreading devices can be employed to maintain separation of the streamer cables 110, including foil wings as described in U.S. Pat. No. 10,254,422.

A signal cable 116 can extend from the marine vessel 102 on one side of the array 100 to connect to the cross-cable 108 and return signals received by the sensors 111 on the streamer cables 110. On an opposite side of the array 100, a recovery rope 118 can extend from the marine vessel 102 and connect with the cross-cable 108 adjacent to the last streamer cable 110. Surface floats 117 can be attached to the cross-cable 108 at or adjacent to the lateral ends thereof via a cable with a length corresponding to a desired depth of the streamer cables 110. The surface floats 117 act to ensure that the cross-cable 108, and thus the streamer cables 110, do not submerge too deeply when the array 100 is towed.

Unfortunately, the port and starboard ends of the cross-cable 108, and thus the streamer cables 110 attached thereto, may not achieve a desired depth beneath the surface due to the pull of the paravanes 112 on the spur lines 114. The paravanes 112 remain at the surface of the water and thus pull the lateral ends of the cross-cable 108 upward as well as laterally outward.

Figure 2:
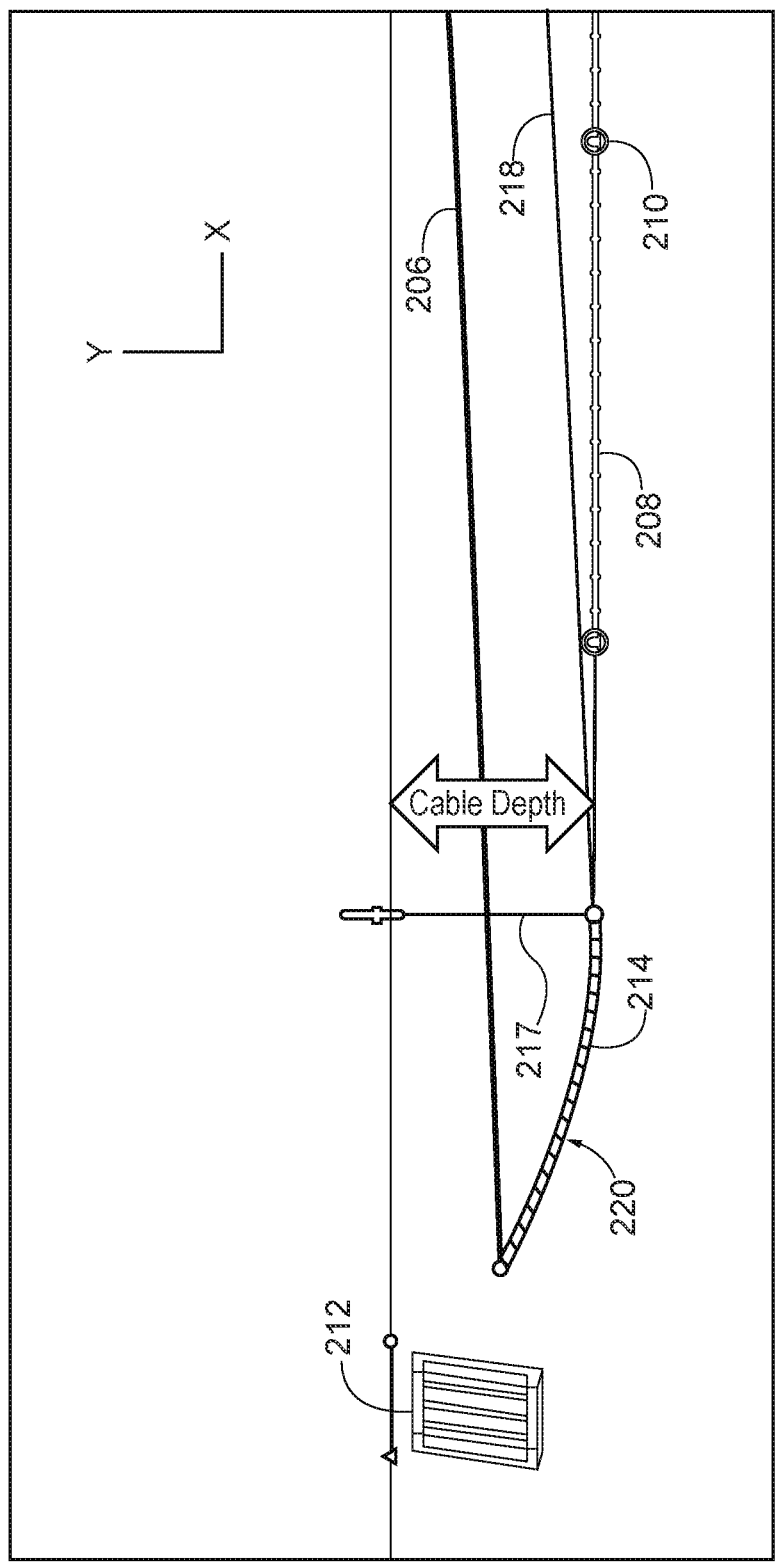
FIG. 2 depicts an enlarged, partial rear elevation view of a schematic illustration of an embodiment of the towed marine cable array of FIG. 1A.

To counteract the effect of the paravanes 212 on the cross-cable 208, a positioning device or depressor 220 designed to provide downward lift can be attached to the cross-cable 208, the spur line 214, or both, as shown in FIG. 2. The depressor 220 can be composed of a number of foils pivotably attached to the cross-cable 208 or the spur line 214. The collection of foils forming depressor 220 are referred to herein as a "modular foil depressor." As shown in FIG. 2, the modular foil depressors 220 can fill the entire length of the spur line 214. Alternatively, the modular foil depressor 220 can only fill a portion of the spur line 214 and can be situated either laterally outward closer to the paravanes 212 or more inward closer to the streamer cables 210. As noted above, the modular foil depressor 220 can also be positioned on the cross-cable 208, inside the port-most and starboard-most streamer cables 210. The location of the modular foil depressor 220 can be selected based upon a number of factors including the amount of downward lift generated by the modular foil depressor 220; the separation distance of the streamer cables 210; the mass of sensors of the array, the streamer cables 210, and the cross-cable 208; and the lift force generated by the paravanes 212, among other factors.

Figure 3:
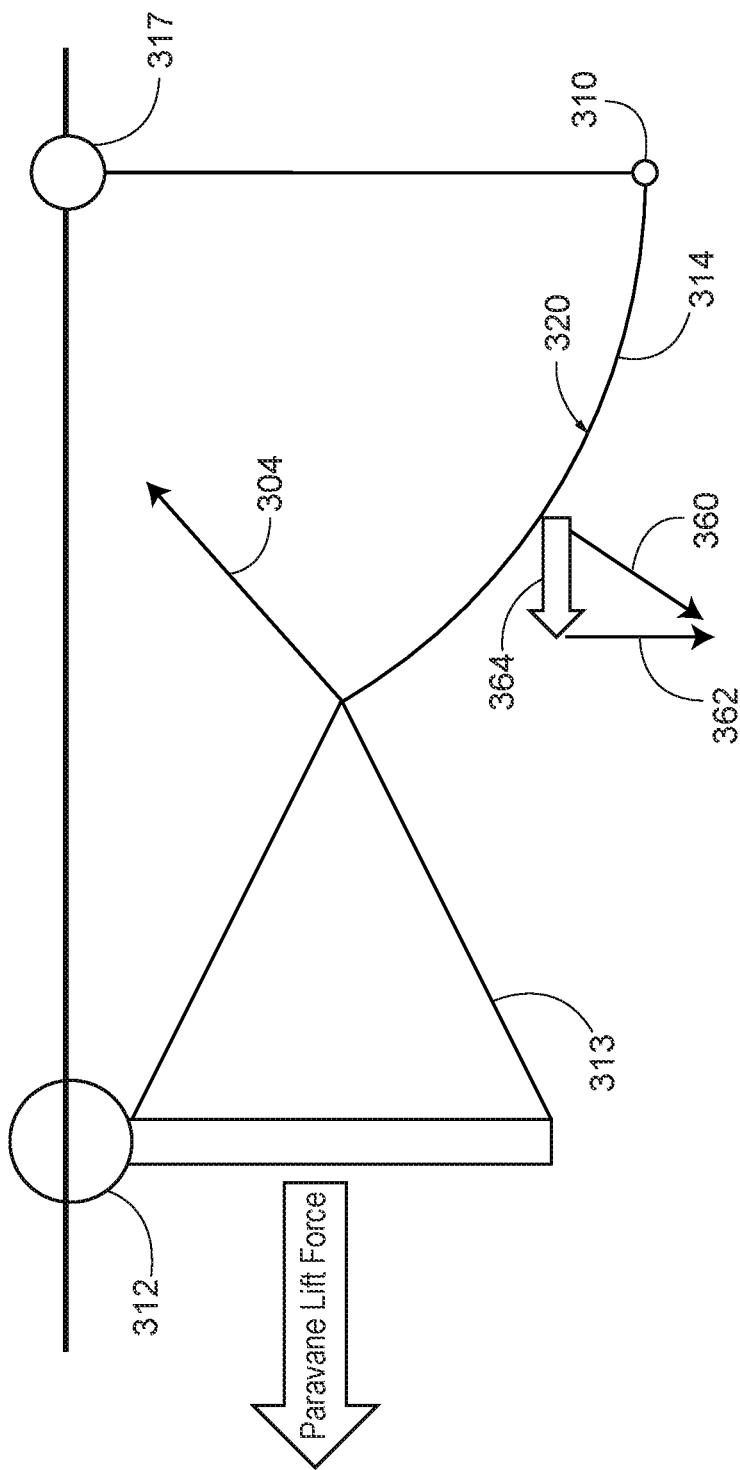
FIG. 3 depicts an enlarged, partial rear elevation view of a schematic illustration of a port side of a towed seismic array with a system of foil depressors provided on the spur line and connected to the port paravane bridle.

In addition to the depth control discussed, as shown in FIG. 3, a modular foil depressor 320 deployed on the spur line 314 can also provide "lift assist" to the paravanes 312 attached by a bridle 313 to the intersection of the tow lines 304 and the spur line 314. While the modular foil depressor 320 induces a downward catenary to the spur line 314, as shown in FIG. 3, a first component 362 of the lift force 360 acts downward as discussed above, but a second component 364 of the lift force 360 also acts horizontally (i.e., outward). This horizontal "lift assist" of the second component 364 provided by the modular foil depressor 320 means that the existing standard paravanes 312 will now be able to spread the seismic array wider than previously possible. Alternatively, the configuration including the modular foil depressor 320 on the spur line 314 can achieve the same spread but at a shorter offset behind the marine vessel towing the array. In another implementation, the same spread and offset can be achieved, but a more efficient setting for the bridle 313 attaching the paravanes 312 can be used and hence reduce fuel consumption of the marine vessel. In addition, a series of modular foil depressor sections can be used on spur lines to achieve depression forces to submerge streamer heads down to desired depths for seismic arrays.

The modular foil depressor can provide a number of other features and advantages. The modular foil depressor can readily be installed on existing in-water equipment, such as, for example, by threading the individual depressor sections onto existing spur lines between paravanes and outboard streamer cable heads. Modular foil depressors can also be installed on numerous other existing ropes.

The modular foil depressor can be deployed over the side of the marine vessel, or down the gun chute, and will then self-orient and generate lift without operator intervention. Handling, deployment, and recovery operations are essentially hands-free with no special davits or dedicated winches or cranes required. The modular foil depressor is also compact and can be easily and efficiently stowed on the vessel when onboard.

Figure 4:
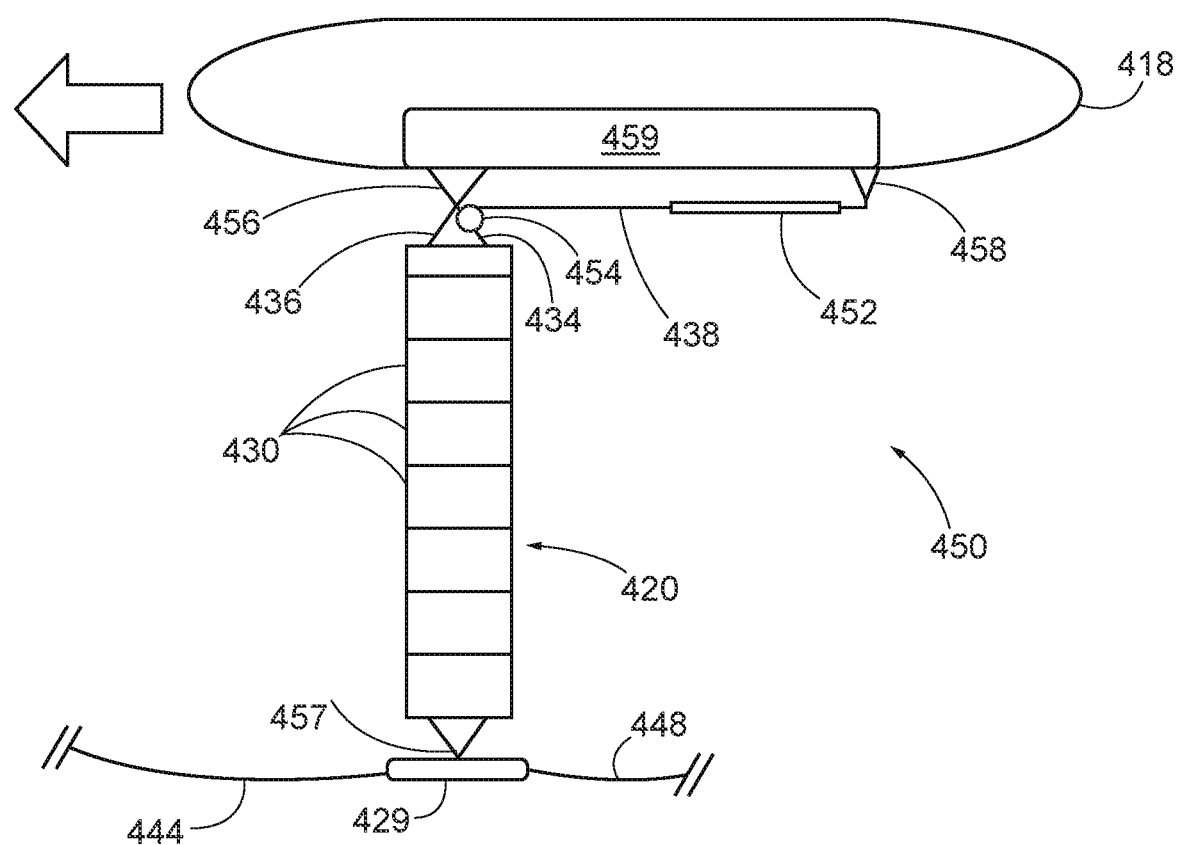
FIG. 4 depicts a schematic illustration of a cable adjustment mechanism for a foil system.

In other embodiments, a foil system can be used to generate a lift along a lateral direction. This can allow a foil system to steer or position a component of the towed marine cable array. For purposes of illustration, a schematic illustration of a dynamic wing foil system 420, composed of a number of adjacent foil sections 430, is shown in FIG. 4. The dynamic wing foil system 420 can generally extend vertically into a marine environment and generate lift that is used to steer components of the array.

To facilitate the foregoing, the dynamic wing foil system 420 is shown in FIG. 4 as including a representative adjustment mechanism 450. The adjustment mechanism 450 can include various components that can be used to manipulate the wing foil system 420, such as manipulate an orientation of the wing foil system 420 to generate a target lift when towed through the marine environment. In an embodiment, the adjustment mechanisms can include turnbuckles 452 and pulleys 454, ratchets, winches, cable guides, and feed mechanisms that can be mounted to the floatation apparatus 418, e.g., between one or more of the control through-cables 438 and an aft anchor point 458 on the back or rear section of the floatation apparatus 418 (in the trailing edge direction of the foil sections 430). In some designs a single control cable 438 can be used, extending from the forward cable anchor 456 down along a forward cable section 436, then passing through a cable return or wrapping or inflecting around a cable connector 429 attached to a submerged cable 444, and back up along an aft cable section 434 to the rear anchor 458 through the pulley 454.

Figure 5A:
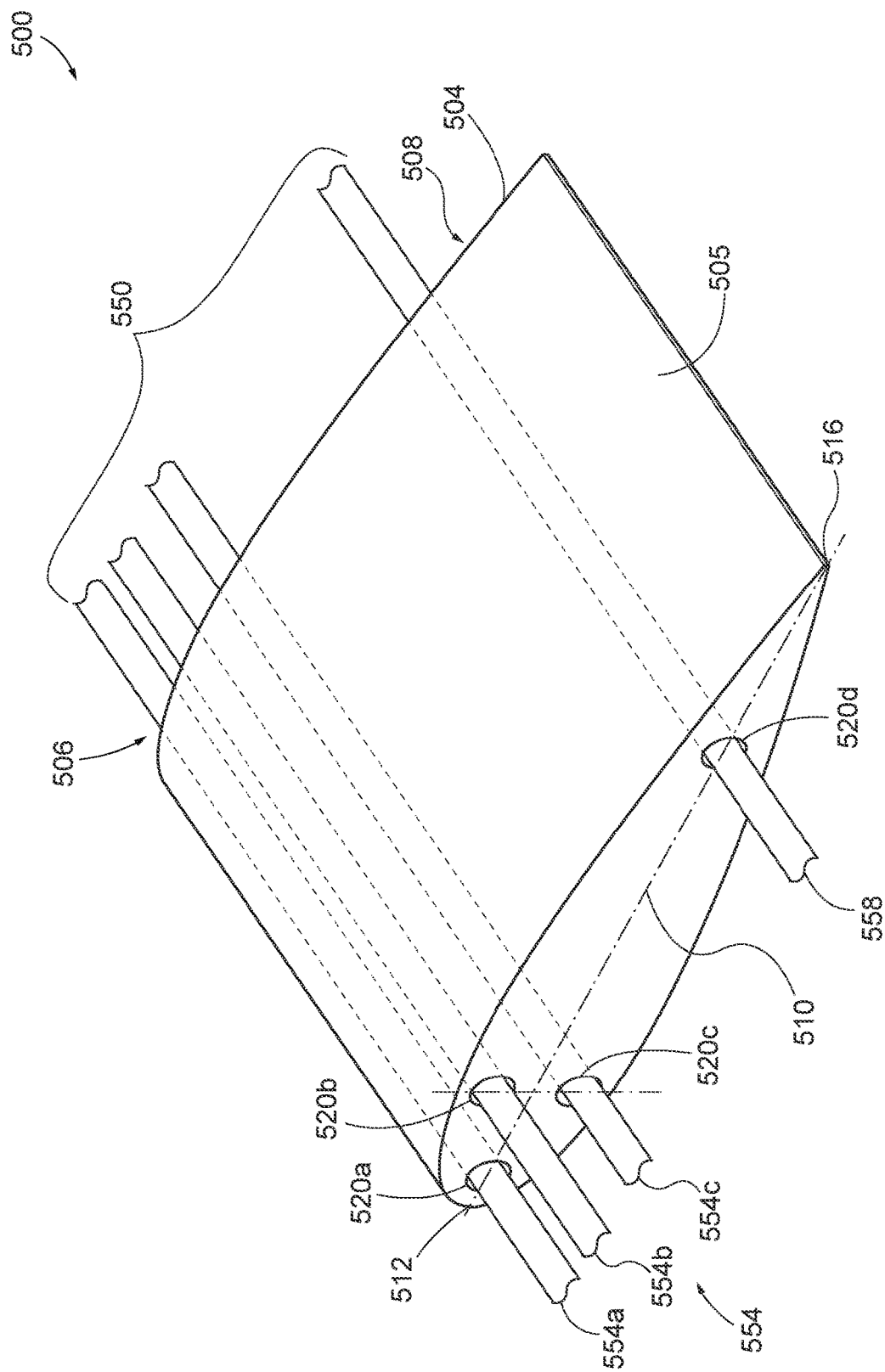
FIG. 5A depicts a schematic illustration of an embodiment of a foil system of the present disclosure.

Alternatively, separate forward and aft control cables 436, 434 can be provided, e.g., individually attached at the submerged cable connector 429. A separate forward through-able 436 can extend between a termination point 456 on the surface float 418 and termination point 457 on the cable connector 459. An aft through-cable 434 can extend through the foil sections 430 from the termination point 457 on the foil connector 429 to an aft termination point 458 on the surface float 418. The adjustment mechanism 450 can be configured for adjusting either the forward cable 436 or the aft cable 438; both embodiments are encompassed. Another option is to use an adjustment mechanism 450 that provides differential adjustments to both forward and aft cables 436, 434; e.g., by shortening one cable while lengthening the other at the same time. In some cases, the forward control cable 436 can be a collection of forward control cables, such as including three or more forward through-cables, as shown in the embodiment of FIG. 5A In this regard, it will be appreciated that the wing foil system 420 can be manipulated in a manner similar to that described in the embodiment of FIG. 5A The submerged cable 444 can be provided either as a tow line for a streamer cable 448 or as an umbilical for a source gun array.

A control device 459 for the adjustment mechanisms 450 can be located at either the top or bottom end of the foil wing system 420, for example, inside the floatation apparatus 418 or attached alongside the bottom rigging hardware 429. Suitable control devices 459 include processor, memory, and software components configured to direct the adjustment mechanisms 450 to selectively vary the length and/or tension in any or all of the through-cables 438 in order to regulate the lift and steering forces generated by the foil wing system 420 by changing the angle of attack along individual foil sections 430. For example, the control device 459 can be configured to control electric motors or similar drive devices in order to actuate the combined adjustment mechanism 450, providing for automated steering by adjustment of the relative lengths and tensions in the forward and aft control cables 436, 434. Other control options include, but are not limited to, hydraulic and pneumatically controlled ram or piston mechanisms, electric winch drives, and motor-driven rack and pinion arrangements. For example, in some cases, control systems and configurations such as those described in U.S. Patent Application Publication No. US20170106946A5 be employed to facilitate tensioning of the cables described with respect to FIG. 4.

In the context of a seismic survey as described above, a number of seismic energy source devices and/or a number of sensor nodes can be attached along the length of cables deployed and towed behind the marine vessel. Each of the cables, or the seismic equipment attached to the cables, can have a steering device associated therewith in order to adjust the position of the cable or seismic devices within the water. In some implementations, it can be very important that the towed marine equipment such as the cables with seismic equipment closely follow a predetermined course (e.g., in order to accurately map a subsurface formation). In addition, if multiple cables are deployed behind a marine vessel it can be important to maintain a constant separation distance between the cables. To meet these needs, steering mechanisms can be attached to each cable and further or alternatively attached to the equipment towed by the cable.

The foil wing systems 420 are just one exemplary implementation of a steering mechanism that can be employed to steer and position cables, seismic energy sources, sensor nodes, buoys and floats in the seismic array, etc. Other steering mechanisms for attachment to such sensor array components exist. These can include paravanes, hydrofoils, rudders, wings, elevators, and various other devices. The orientations of each of these devices while being towed through the water can be adjusted for steering. Such adjustments can be made by increasing or decreasing tension on control cables (i.e., making them more taut or more slack), engaging actuators to physically move a steering element, engaging motors to drive rotating elements, etc. In each case, the steering mechanisms are controlled by signals with instructions calculated to alter the orientation of the steering mechanisms appropriately to maintain a proper course for the seismic array elements within the water. These signals are determined by sophisticated navigation and control systems that work in concert with the navigation of the marine vessel in order to ensure that the elements of the seismic array stay on course and maintain proper separation distances between adjacent elements.

Figure 5B:
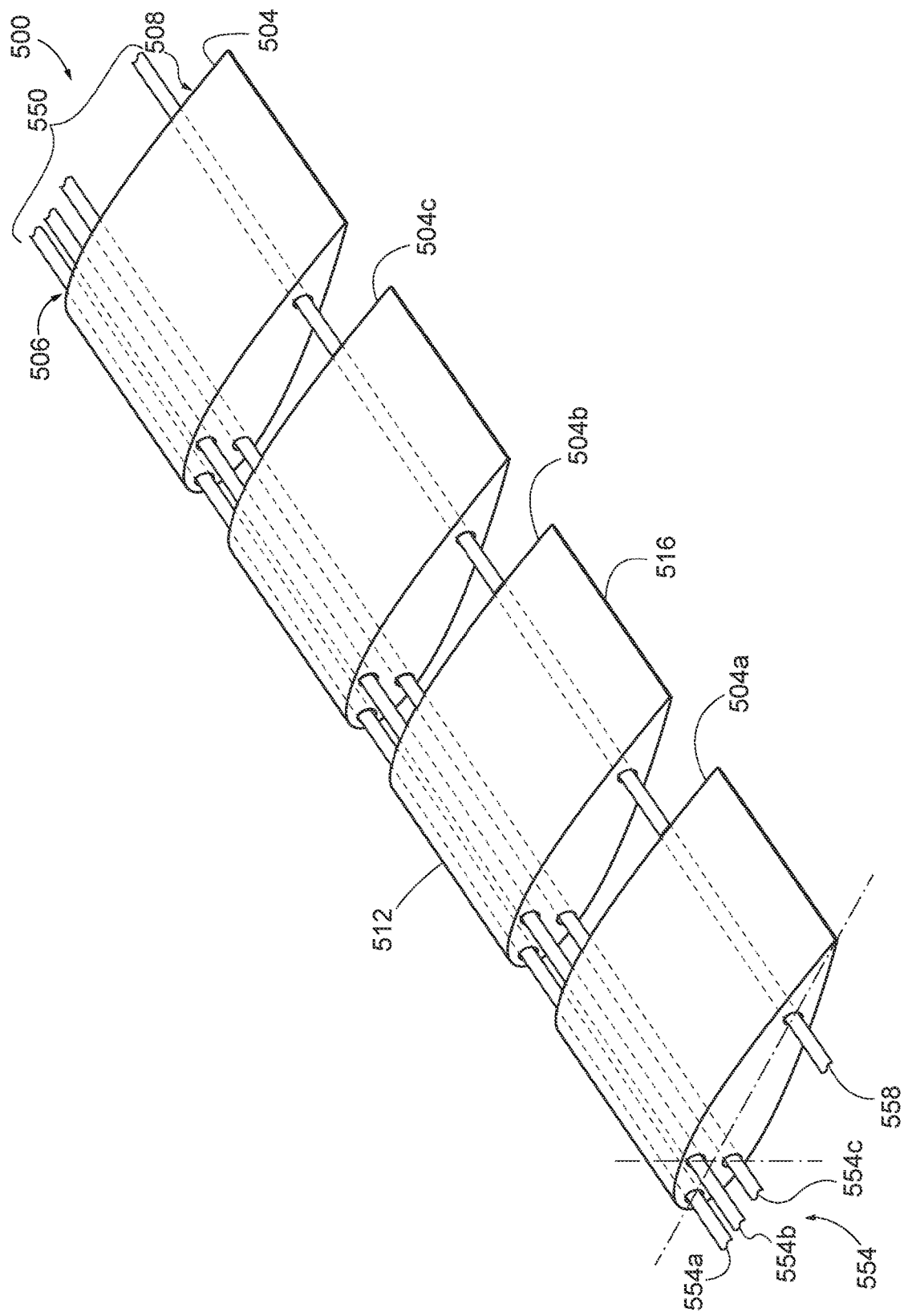
FIG. 5B depicts a schematic illustration of another embodiment of a foil system of the present disclosure.

FIGS. 5A and 5B depict sample illustrations of embodiments of a foil system of the present disclosure. In particular, FIGS. 5A and 5B depict foil systems in which through-cables can be selectively tensioned and manipulated in order to define various rotational constraints that can induce a target angle of attack. As described herein, this can include inducing a positive, negative, and/or neutral angle of attack, as can be appropriate for a given configuration. Broadly, the embodiments herein show that one or more through-cables arranged in the front section of the foil can be tensioned and manipulated into a selected configuration in which the given through-cable can define the rotational constraint. In this regard, where the tensioned and selected through-cable is arranged along the chord, the foil can assume a substantially neutral angle of attack. And further, where the selected through-cable is arranged above and/or below the chord, the foil can assume a substantially negative or positive angle of attack, respectively.

It will be appreciated that the foil systems described with respect to FIGS. 5A and 5B can be used with a towed marine cable array. The towed marine cable array can be one of many towed marine cable arrays that are tailored for particular applications, such as seismic surveys. The foil systems can therefore be adapted for use in a variety of marine contexts. In one embodiment, the towed marine cable array can be a seismic array, and the foil system can be used to influence a direction or position of components of the seismic array. This may be beneficial where the position of selective components of array can be used to determine geological data. To illustrate, the seismic array can include components for a source array (e.g., components associated with emitting energy into a marine environment) and a receiver array (e.g., components associated with receiving reflected energy from geophysical structures in response to the emitted energy of the sources). The foil systems can be associated with one or both of the source or receiver arrays in order to influence the position of respective components of each array. In other examples, such as that described in greater detail below with respect to FIG. 12, the towed marine cable array can include components of a fishing trawl, and the foil system can influence the position of components of the fishing trawl. Accordingly, the foil system described herein can be adapted to these and other array applications.

With reference to FIG. 5A, a foil system 500 is shown. The foil system 500 can generally include a foil section 504 and a group of through-cables 550. The group of through-cables 550 are configured to support the foil section 504 (and/or other foil sections) in a towed marine cable array. And as described herein, the group of through-cables 550 can be tensioned and manipulated in order to induce one or more angles of attack of the foil section 504.

To facilitate the foregoing, the foil section 504 can be scalable to suit a wide range of lift requirements, while also offering very high aspect ratios and avoiding any requirement for supplementary ballast. The foil section 504 can have a body 505 with a foil shape having a leading edge 512 and a trailing edge 516. The line connecting the leading edge 512 and the trailing edge 516 passing through the mid-thickness of the body 505 is referred to as the "chord line" of the foil shape, indicated as chord 510 in phantom line in FIG. 5A. When viewed from a top plan perspective, the foil section 504 can appear rectangular in shape. Surfaces extending between the leading 512 and trailing edge 516 can be symmetrically cambered, to define a substantially symmetrical cross-section of the body 505. In other cases, such as that shown in FIG. 9, one surface can be more or less cambered than the opposing one, and thus define a substantially asymmetrical foil body.

The body 505 can be made from solid cast polyurethane for near-neutral buoyancy and high abrasion resistance and durability. However, the body 505 can still be slightly negatively or positively buoyant, such that the body 505 can influence the equilibrium angle of attack when towed horizontally through the water, especially at low tow speeds. Thus, the downforce achieved by the foil section 504 can be influenced by selecting the composition of the body 505. The foil body can also include internal voids which can be filled with positively or negatively buoyant materials to further influence the equilibrium angle of attack of the foil body when towed through the water in a horizontal orientation.

A collection of leading edge tubular conduits or ducts can be defined within the body 505 and extend laterally through the body 505 adjacent to the leading edge 512 and open to each of the first and second lateral sides of the foil. For example, FIG. 5A shows a first duct 520a, a second duct 520b, and a third duct 520c. Each of the first duct 520a, the second duct 520b, and the third duct 520c are arranged adjacent to the leading edge 512 and within and through a front half 506 of the body 505. The first duct 520a, the second duct 520b, and the third duct 520c can be sized to receive through-cables, ropes, or cables (such as separation ropes and/or spur lines) of a seismic array therethrough.

Another tubular conduit or duct can be defined within the body 505 forward of the trailing edge 516 and extending laterally therein parallel to the collection of tubular conduits or ducts that are along the leading edge 512 and open to each of the first and second lateral sides of the foil body 505. For example, FIG. 5A shows a fourth duct 520d, which can be positioned within the aft 50 percent of the cord length of the foil section 504, such as being within the back half 508 of the foil body 505. The fourth duct 520d can be similarly sized to receive a through-cable, rope, or other cable therethrough.

FIG. 5A also shows the foil system 500 including the group of through-cables 550, as described above. The group of through-cables 550 can include a subset of through-cables 554 arranged substantially within the front half 506 of the foil body 505. While many configurations are possible, the subset of through-cables 554, can include a first leading edge through-cable 554a, a second leading edge through-cable 554b, and a third leading edge through-cable 554c. The group of through-cables 550 can also further include a trialing edge through-cable 558 arranged within the back half 508 of the body 505. The group of through-cables 550 is shown extending through the foil section 504 via various ducts defined through the body 505. For example, the first leading-edge through-cable 554a can be arranged within the first duct 520a, the second leading edge through-cable 554b can be arranged within the second duct 520b, the third leading edge through-cable 554c can be arranged within the third duct 520c, and the trailing edge through-cable 558 can be arranged within the fourth duct 520d.

As shown in FIG. 5A, the first duct 520a and the fourth duct 520d are arranged substantially along the chord 510. The second duct 520b is arranged above the chord 510. The third duct 520c is arranged below the chord 510. It will be appreciated that other arrangements of the ducts are possible and contemplated within the scope of the present disclosure.

As described herein, the subset of through-cables 554 can be selectively tensioned and manipulated in order to define a rotational constraint of the first half 506 of the body 505 to the second half 508 of the body 505. For example, one or more first actuators (e.g., first actuator 670 of FIG. 6) can operate to tension the subset of through-cables 554. This can include inducing an initial baseline of tension in each of the subset of through-cables 554, thereby allowing the subset of through-cables 554 to be further manipulated for defining the various rotational constraints herein.

Continuing the illustration, one or more second actuators (e.g., second actuator 680) can operate to manipulate the subset of through-cables 554, so that a given cable of the subset is used to define a rotational constraint of the front half 506 relative to the back half 508. For example, the second actuator can effectively apply tension to the subset of through-cables 554 through a particular through-cable of the subset 554, thereby defining the rotational constraint based on the positional arrangement of the particular through-cable relative to the chord 510. To illustrate, in a configuration, tension can be applied to the first leading edge through-cable 554a of the subset 554 and, as such, the position of the foil section 504 can be defined by the cooperative effect of the first leading edge through-cable 554a and the trialing edge through-cable 558 on the foil section 504. As both the first leading edge through-cable 554a and the trialing edge through-cable 558 are positioned along the chord 510 and the foil body 505 is substantially symmetrical, applying tension on the subset 554 through the first leading edge through-cable 554a can direct the foil section 504 to assume a substantially neutral angle of attack.

In another configuration, tension can be applied to the second leading edge through-cable 554b of the subset 554 and, as such, the position of the foil section 504 can be defined by the cooperative effect of the second leading edge through-cable 554b and the trialing edge through-cable 558 on the foil section 504. As the second leading edge through-cable 554b is positioned above the chord 510 and the trialing edge through-cable 558 is positioned along the chord 510 and the foil body 505 is substantially symmetrical, applying tension on the subset through the second leading edge through-cable 554b can direct the foil section 504 to assume a substantially negative angle of attack.

In another configuration, tension can be applied to the third leading edge through-cable 554c of the subset 554 and, as such, the position of the foil section 504 can be defined by the cooperative effect of the third leading edge through-cable 554c and the trialing edge through-cable 558 on the foil section 504. As the third leading edge through-cable 554c is positioned below the chord 510 and the trialing edge through-cable 558 is positioned along the chord 510 and the foil body 505 is substantially symmetrical, applying tension on the subset 554 through the third leading edge through-cable 554c can direct the foil section 504 to assume a substantially positive angle of attack.

With reference to FIG. 5B, the foil system 500 of FIG. 5A is shown having multiple foil sections 504 (e.g., foil sections 504a, 504b, 504c). Broadly, the number of foil sections 504 in the foil system 500 is scalable to suit a wide range of lift requirements, while also offering very high aspect ratios and avoiding any requirement for supplementary ballast. The foil sections 504 can rotate in a flow field. The angle of attack at which the foil system 500 can achieve equilibrium can be a function of the moment coefficient of the particular cross-section of the foil 504 being used in conjunction with the comparative tensions and positions relative to the chord 512 established in the subset of cables 554 with respect to the trailing edge through-cable 558. Consequently, the magnitude of lift (positive or negative) generated by the foil system 500 formed by foil sections 504 can also be controlled by various factors including the following:

Adjusting the overall span of the foil system 500 (e.g., the number of foil sections 504 threaded onto the various through-cables);

Varying the length of the chord 512 of the foil sections 504 (e.g., customize the size of the foil sections 504 at time of manufacture to suit the required end application); and Choice of camber for the foil profile of the foil sections 504 (lesser or greater cambered foil depressor sections 504 generate lower or higher lift coefficients, including adapting the profile to exhibit a substantially symmetrical or asymmetrical contour).

In some cases, the foil system 500 can be a modular foil system. For example, multiple groups of foil sections can be connected to one another and optionally can have a separately controllable and manipulable angles of attack relative to other groups of foil sections of the system. The modular foil system offers a high degree of flexibility in terms of the number of choices available, including pivot location, camber, chord length, and tail fin size and angle, to selectively adjust the lift to suit operational requirements and specifications. Lift is also adjustable by adjusting the tension in the cables running through the foils.

Modular foil systems applied to umbilicals or other similar type cables can also be scaled by how many are deployed, for example, by daisy-chaining foil systems at intervals along the cable. As described herein, modular foil systems, including various combinations of foil sections, shapes, systems, and so forth can be used to generate a negative or positive lift (e.g., along a vertical direction) that depresses or maintains components of a towed marine cable array at a submerged depth.

Figure 6:
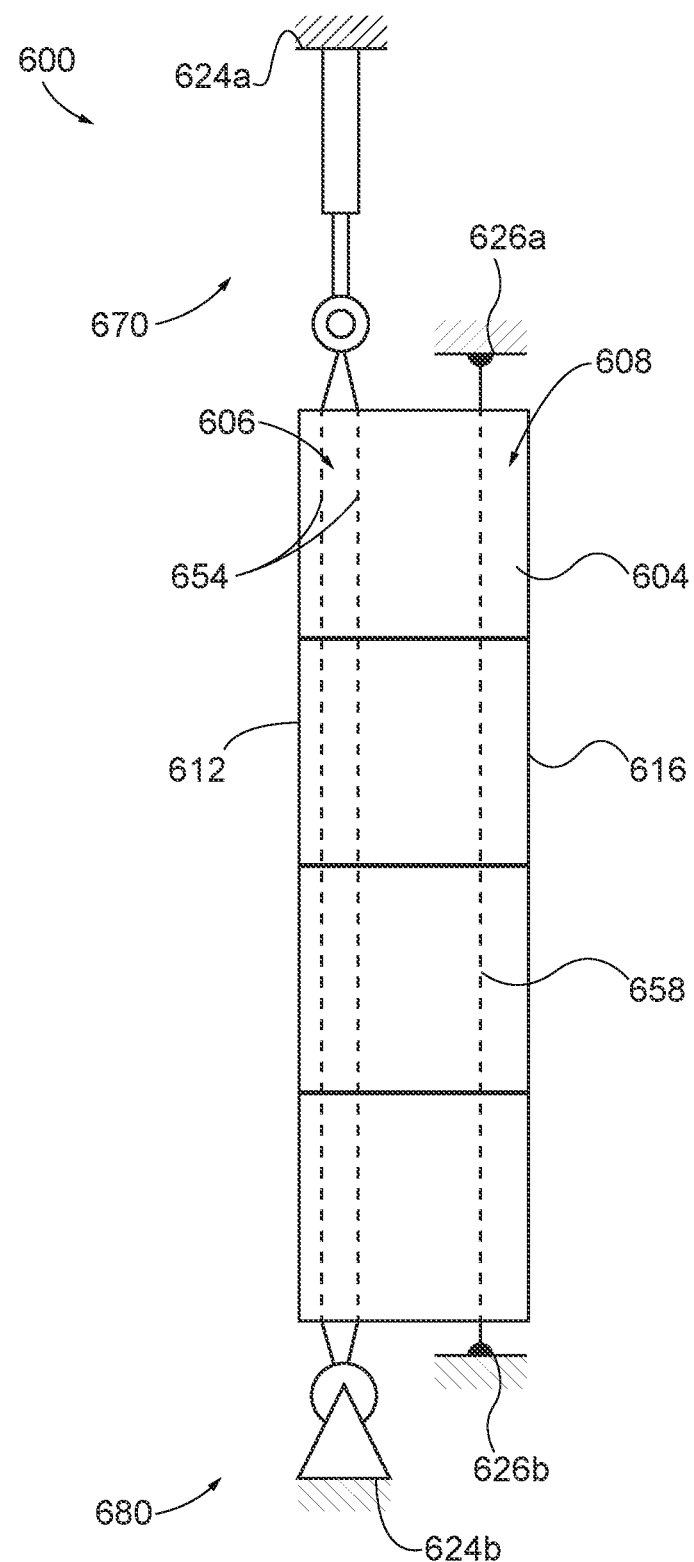
FIG. 6 depicts a schematic illustration of another embodiment of a foil system of the present disclosure.

Turning to FIG. 6, another embodiment of the foil system 600 is shown. The foil system 600 can be substantially analogous to the foil system 500 described above with respect to FIGS. 5A and 5B. For example, the foil system 600 can be supported in a towed marine cable array by a group of through-cables. One or more actuators can be configured to selectively tension and manipulate a subset of through-cables arranged in front halves of the foil sections. This can define a rotational constraint of the front halves relative to the back halves that can induce one or more of a positive, a negative, and/or neutral angle of attack. In this regard, the foil system can include foil sections 604, a front half 606, a back half 608, a leading edge 612, a trailing edge 616, a subset of through-cables 654, and a trailing edge through-cable 658, redundant explanation of which is omitted here for clarity.

FIG. 6 shows the foil system 600 in the schematic context of a sample towed marine cable array. For example, the trailing edge through-cable 658 can extend through each of the foil sections 604 along the trailing edge 616. The trailing edge through-cable 658 can be connected to the towed marine cable array at a first connection 626a and at a second connection 626b, opposite of the first connection 626a. For purposes of illustration, the connections 626a, 626b are shown as fixed connections. It will be appreciated that the connections 626a, 626b can be representative of substantially any appropriate component of a towed marine cable array, in order to secure the back halves of the foil section 604 within the towed marine cable array. In some cases, the trailing edge through-cable 658 can be coupled with an actuator and/or other device to adjust the tension or otherwise manipulate the trailing edge through-cable 658, however, this is not required.

FIG. 6 also shows the foil system 600 supported within the schematic context of the sample towed marine cable array via the subset of through-cables 654. The subset of through-cables 654 generally extends adjacent to the leading edge 612 of the foil sections 604. The subset of through-cables 654 can be coupled with a first actuator 670 at a first end of the foil sections 604. The first actuator 670 can couple the subset of through-cables 654 with the towed marine cable array via a first connection 624a. As further shown in FIG. 6, the subset of through-cables 654 can be coupled with a second actuator 680, opposite the first actuator 670. The second actuator 680 can couple the subset of through-cables 654 to the towed marine cable array via a second connection 624b. The connections 624a, 624b can be representative of substantially any appropriate component of a towed marine cable array, in order to secure the back halves of the foil section 604 within the towed marine cable array.

As described herein, the subset of through-cables 654 can be manipulated in order to define a rotational constraint of the foil sections 604 and induce an angle of attack. To facilitate this functionality, the first actuator 670 can be configured to increase or decrease the lengths of the through-cables within the subset of the forward through-cables 654, thereby inducing an initial tension distribution across the entire set of through-cables 654 and 658. This initial tension distribution then defines a baseline angle of attack for the foil system 600 that can be further manipulated to change the rotational constraint to achieve a desired angle of attack.

In this regard, the second actuator 680 can further manipulate the subset of through-cables 654 in order to define the rotational constraint. As demonstrated further by the enlarged views of FIG. 7A-7C below, the second actuator 680 can operate to channel and/or otherwise cause a selected through-cable of the subset of through-cables 654 to carry some, a majority, or substantially all of the tension initially applied by the first actuator 670 in the forward subset of through-cables 654, which in turn may cause the tension in the aft through-cable 658 to increase or decrease as well. By applying tension to the selected one of forward through-cables, a rotational constraint of the front halves 606 of the foil sections 604 relative to the back halves 608 can be defined. And depending on the positional arrangement of the selected one of the through-cables under the greater tension, the foil sections 604 can thus assume a positive, negative, and/or neutral angle of attack, as described herein.

Figure 7A:
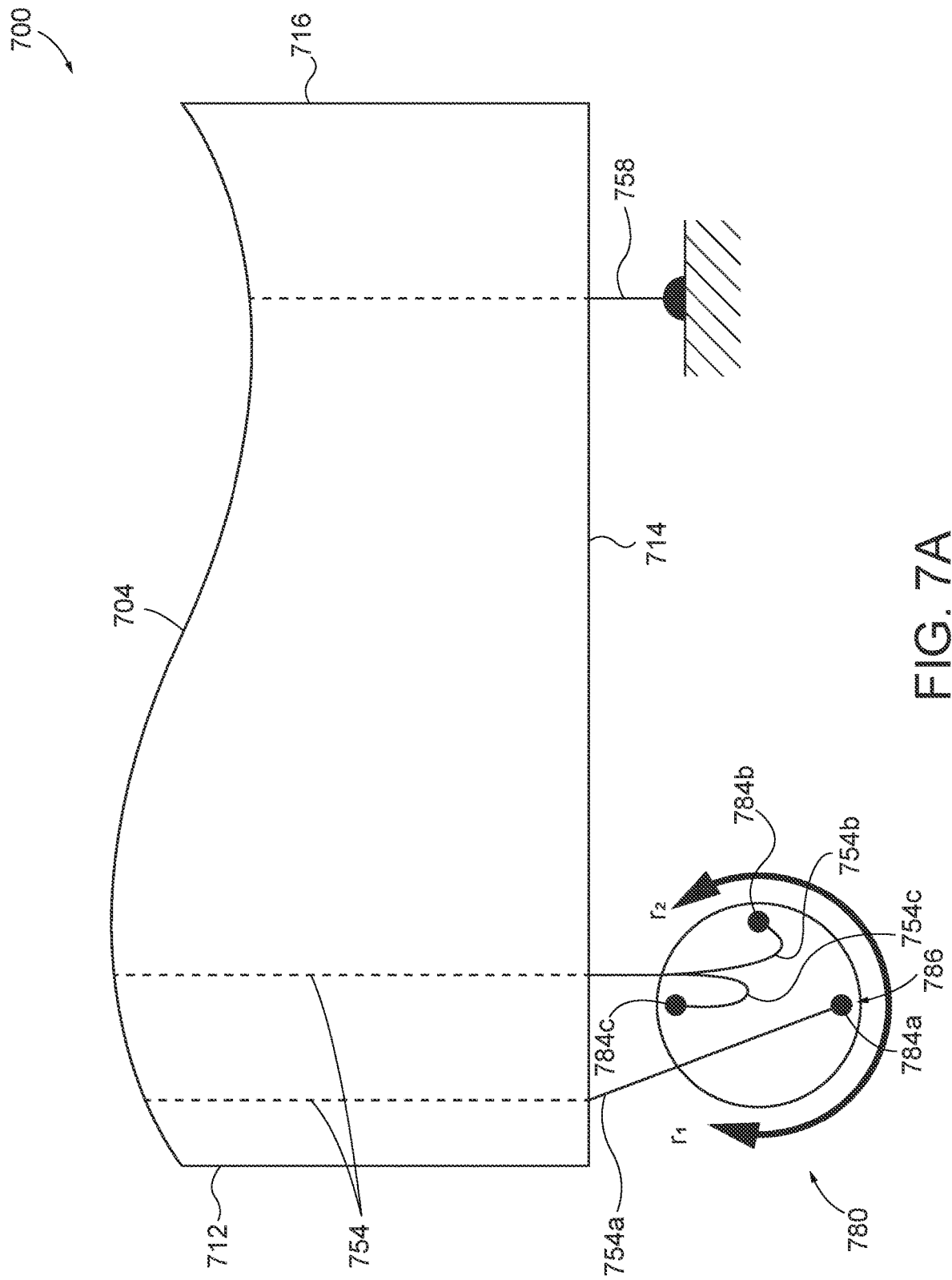
FIG. 7A depicts an embodiment of an enlarged view of the foil system having an actuator in a first configuration.
Figure 7B:
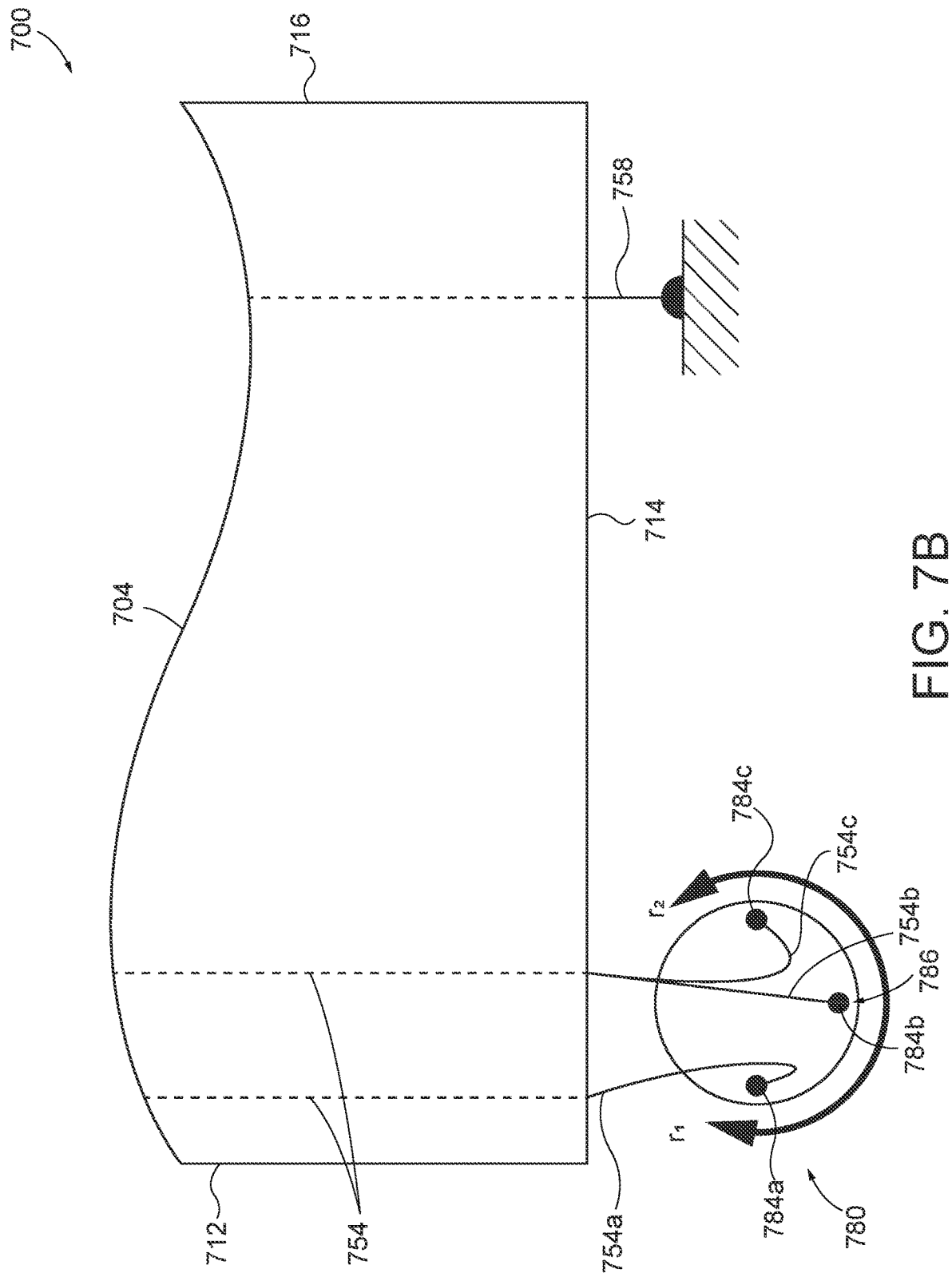
FIG. 7B depicts an embodiment of an enlarged view of the foil system having an actuator in a second configuration.
Figure 7C:
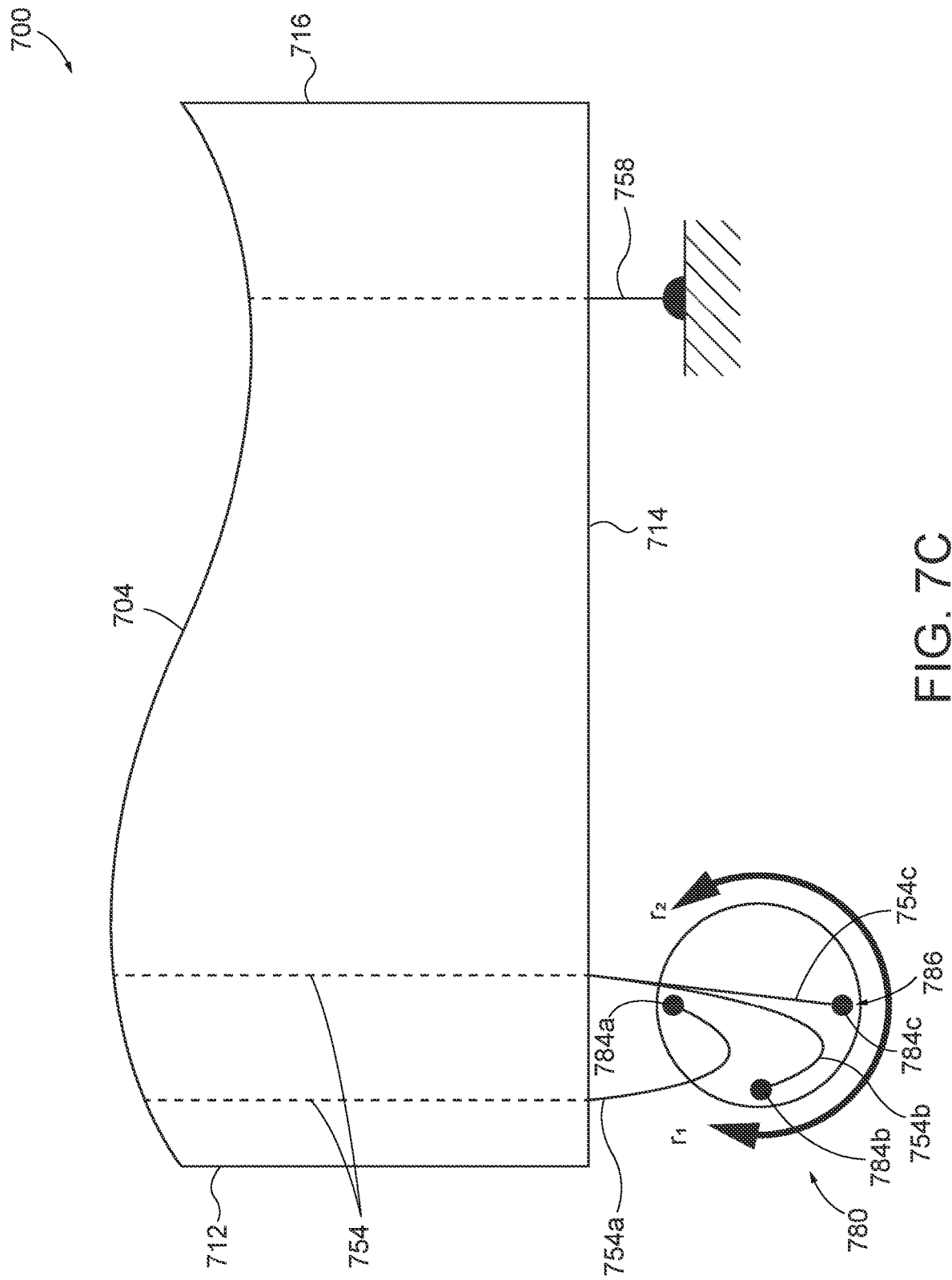
FIG. 7C depicts an embodiment of an enlarged view of the foil system having an actuator in a third configuration.

FIGS. 7A-7C depicts sample enlarged schematic views of a foil system 700. The foil system 700 can be substantially analogous to the foil system 600 of FIG. 6, and thus include a foil section 704, a leading edge 712, a trailing edge 716, a subset of through-cables 754, a trailing edge through-cable 758, and a second actuator 780. Redundant explanation of such features is omitted here for clarity.

As illustrated in FIGS. 7A-7C, the phantom lines representing the subset of through-cables 754, can correspond to three through-cables: a first leading edge through-cable 754a, a second leading edge through-cable 754b, and a third leading edge through-cable 754c. The first leading edge through-cable 754a, the second leading edge through-cable 754b, and the third leading edge through-cable 754c, can be substantially analogous to the first leading edge through-cable 554a, the second leading edge through-cable 554b, and the third leading edge through-cable 554c of FIG. 5 and redundant explanation of such is omitted here for clarity.

As shown in FIGS. 7A-7C, the second actuator 780 can be configured to manipulate the subset of through-cables 754 in order to define one or more of the first leading edge through-cable 754a, the second leading edge through-cable 754b, and the third leading edge through-cable 754c as the selected tensioned cable of the subset 754 that defines the rotational constraint. In the embodiment of FIGS. 7A-7C, the second actuator 780 is shown schematically as a selector wheel. The first leading edge through-cable 754a can be connected to the selector wheel at a first connection 784a, the second leading edge through-cable 754b can be connected to the selector wheel at a second connection 784b, and the third leading edge through-cable 754b can be connected to the selector wheel at a third connection 784c. The selector wheel can be configured to rotate, for example, in directions r1 and r2 as shown in FIGS. 7A-7C.

The selector wheel 780 can rotate to define one of the first connection 784a, the second connection 784b, or the third connection 784c at a position of the selector wheel most distal from the lateral edge 714 of the foil section 704. More broadly, the selector wheel can rotate so as to define one of the first connection 784a, the second connection 784b, or the third connection 784c as being the furthest from the foil section 704 at a distal point 786. In this sense, whichever through-cable is connected via the most distal point 786 will support the entirety of the tension on the subset of the through-cables. For example, because the distal point 786 is furthest from the foil section 704, the end of the though-cable connected to the distal point 786 will be taut, whereas the other through-cables connected to the other connections (closer to foil section 704) on the second actuator 780 can be slack or otherwise be under less tension than the through-cable that is connected to the distal point 786 furthest from the foil section 704.

To illustrate the foregoing, FIG. 7A shows the second actuator 780 in a configuration in which the selector wheel is rotated for positioning the first connection 784a at the distal point 786. The first leading edge through-cable 754a is connected with the first connection 784a and, as such, in this configuration can define a rotational constraint of the foil section 704. As described above, the first leading edge through-cable 754a and the trailing edge through-cable 758 can be both positioned along the chord of a substantially symmetrical foil shape. In this regard, in the configuration shown in FIG. 7A, the foil section 704 can assume and/or maintain a substantially neutral angle of attack.

With reference to FIG. 7B, the second actuator 780 is shown in a configuration in which the selector wheel is rotated for positioning the second connection 784b at the distal point 786. The second leading edge through-cable 754b is connected with the second connection 784b and, as such, in this configuration can define a rotational constraint of the foil section 704. As described above, the second leading edge through-cable 754b is positioned above the chord of a substantially symmetrical foil shape, with the trailing edge through-cable 758 being positioned along the chord. In this configuration shown in FIG. 7B, the foil section 704 can assume and/or maintain a substantially negative angle of attack.

With reference to FIG. 7C, the second actuator 780 is shown in a configuration in which the selector wheel is rotated for positioning the third connection 784c at the distal point 786. The third leading edge through-cable 754c is connected with the third connection 784c, and as such, in this configuration can define a rotational constraint of the foil section 704. As described above, the third leading edge through-cable 754c is positioned below the chord of a substantially symmetrical foil shape, with the trailing edge through-cable 758 being positioned along the chord. In this configuration shown in FIG. 7C, the foil section 704 can assume and/or maintain a substantially positive angle of attack.

Figure 8:
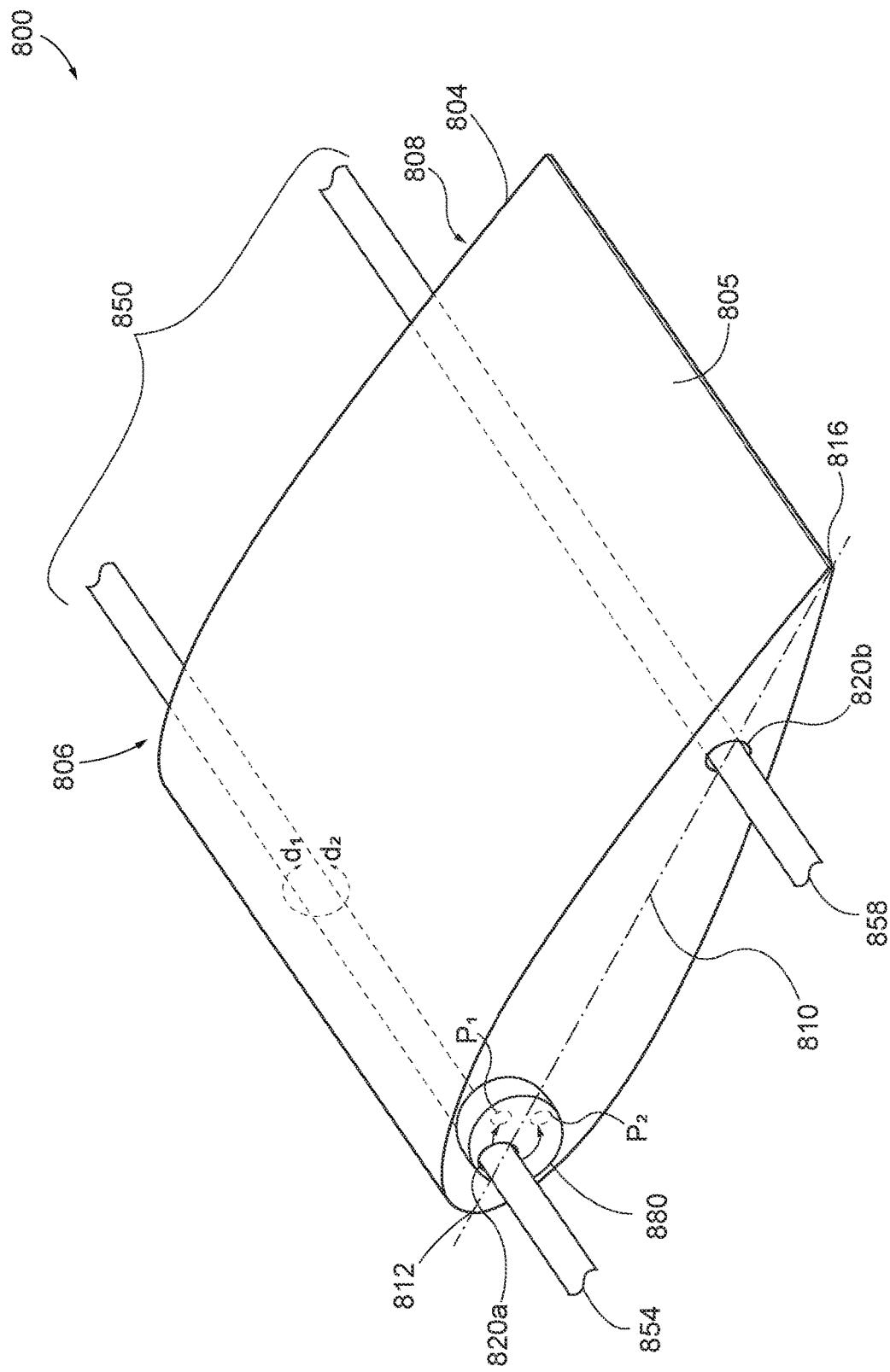
FIG. 8 depicts a schematic illustration of another embodiment of a foil system of the present disclosure.

Turning to FIG. 8, another embodiment of a foil system 800 is shown. The foil system 800 can be substantially analogous to the various foil systems described herein, and thus include a foil section 804, a foil body 805, a front half 806, a back half 808, a chord 810, a leading edge 812, a trailing edge 816, a duct 820a, a duct 820b, a group of through-cables 850, a leading edge through-cable 854, and a trailing edge through-cable 858. Redundant explanation of these features is omitted here for clarity.

In the embodiment of FIG. 8, the group of through-cables 850 includes two through-cables: the leading edge through-cable 854 and the trailing edge through-cable 858. The leading edge through-cable 854 can be considered a subset of the group of through-cables 850. The leading edge through-cable 854 can be selectively tensioned and manipulated in order to define a rotational constraint of the front half 806 relative to the back half 808 of the foil section 804. In some embodiments, a first actuator, such as the first actuator 670 of FIG. 6 (not shown in FIG. 8), may be used to apply tension on the leading edge through-cable 854.

In conjunction with tensioning the leading edge through-cable 854, a second actuator 880 can operate to move the leading edge through-cable 854 relative to the chord 810. In this regard, the second actuator 880 can be a portion of a cam or cam assembly, operable to move the leading edge through-cable 854 positionally within the foil section 804. In some cases, the cam or cam feature can extend completely though the foil section 804, between lateral sides defining the cross-section, and define a tube or guide within the body 805 of the foil section 804. The cam or cam feature can move the tube or guide rotationally, such as along a direction d1 and d2, as shown in FIG. 8. The leading edge through-cable 854 is positioned within the guide via the duct 820a. Thus, when the guide moves, the leading edge through-cable 854 can be caused to move as well, such as to positions P1 and P2, as shown in FIG. 8.

The movement of the leading edge through-cable 854 caused by the second actuator 880 can help induce one or more angles of attack for the foil section 804. For example, when the leading edge through-cable 854 is positioned along the chord 810, as shown in FIG. 8, the foil section 804 can maintain a substantially neutral angle of attack, as described herein. Further, when the leading edge through-cable 854 is positioned above the chord 810, such as substantially at position P1, the foil section 804 can maintain a substantially negative angle of attack. And further, when the leading edge through-cable 854 is positioned below the chord 810, such as substantially at position P2, the foil section 804 can maintain a substantially positive angle of attack.

The foregoing embodiments are present foil systems having foil sections with substantially symmetrical foil shapes. It will be appreciated, however, that the present disclosure can be adapted to foil sections having a variety of different shapes, including foil sections which can be asymmetrical. For example, it can be desirable in certain circumstances to have a foil section with a preset or predetermined positive or negative lift, based on an application of the foil section in the towed marine cable array. This generally asymmetric foil can be manipulated by a group of through-cables in order to maintain the foil in a positive, negative, and/or natural angle of attack, using the techniques described herein.

Figure 9:
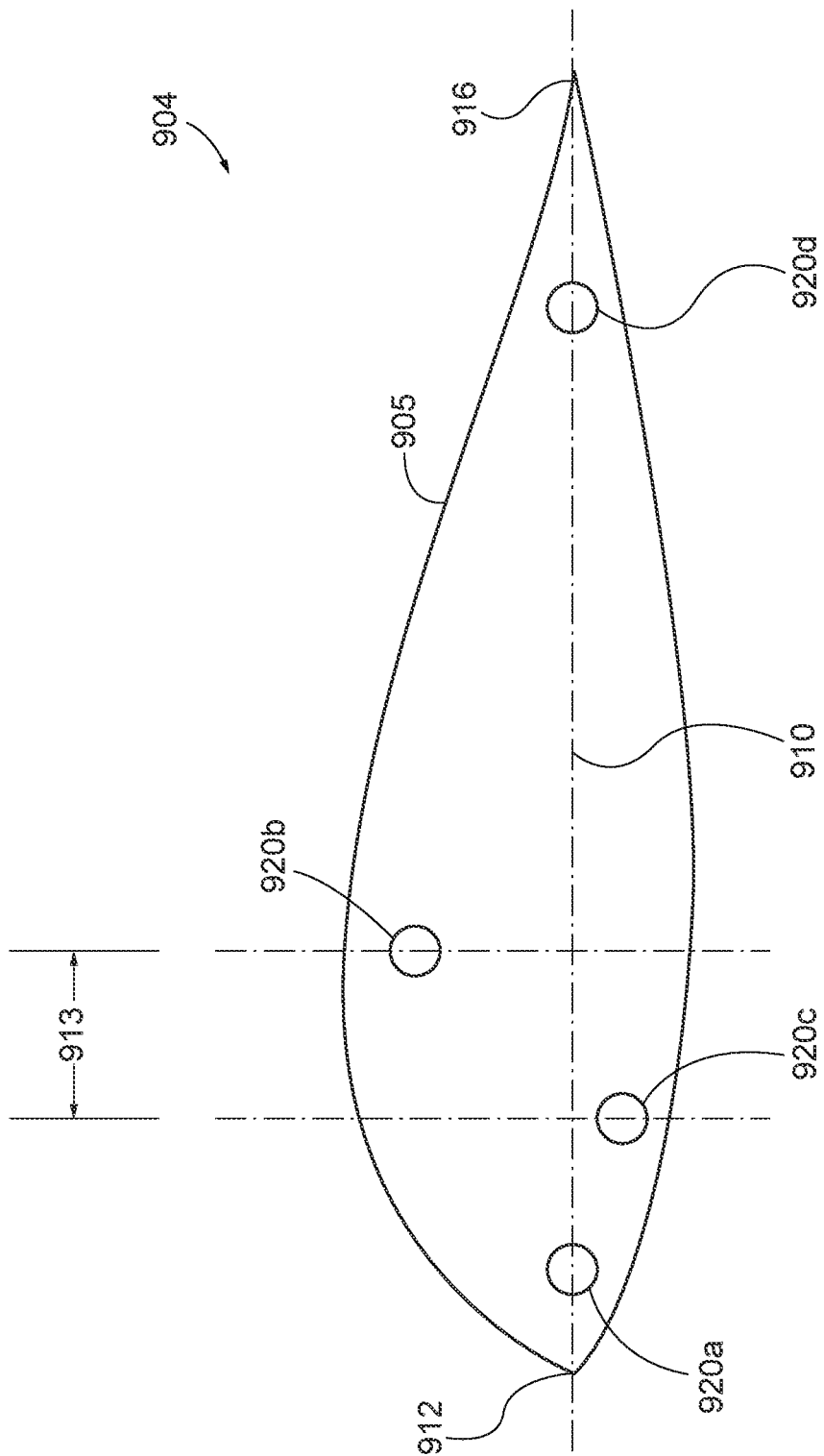
FIG. 9 depicts a sample asymmetric foil for use with one or more foil systems of the present disclosure.

For purposes of illustration, FIG. 9 depicts a sample asymmetric foil 904 for use with one or more foil systems of the present disclosure. The asymmetric foil 904 can be substantially analogous to the foil sections described herein, for example, and include a foil body 905, a chord 910, a leading edge 912, a trailing edge 916, a first duct 920a, a second duct 920b, a third duct 920c, and a fourth duct 920d.

Notwithstanding the foregoing similarities, the ducts 920a-920d can be arranged through the foil body 905 in a manner that accounts for the unique shape of the foil section 904. In the sample illustration of FIG. 9, the first duct 920a and the fourth duct 920d can be arranged substantially along the chord 910. The second duct 920b can be arranged above the chord 910 and the third duct 920d can be arranged below the chord 910. To facilitate manipulation of the foil body 905, the second duct 920b and the third duct 920c can be separated by a lateral offset 913. The lateral offset can allow a foil system to define a rotational constraint of a front half of the foil section 904 relative to the back half of the foil section 904 at positions which account for the substantially asymmetrical shape of the foil body 905. In other cases, other configurations can be possible, including those in which the second duct 920b and the third duct 920c are substantially aligned with one another, as well as other embodiments, in which the second duct 920b is closer to the leading edge 912 than the third duct 920c.

Figure 10:
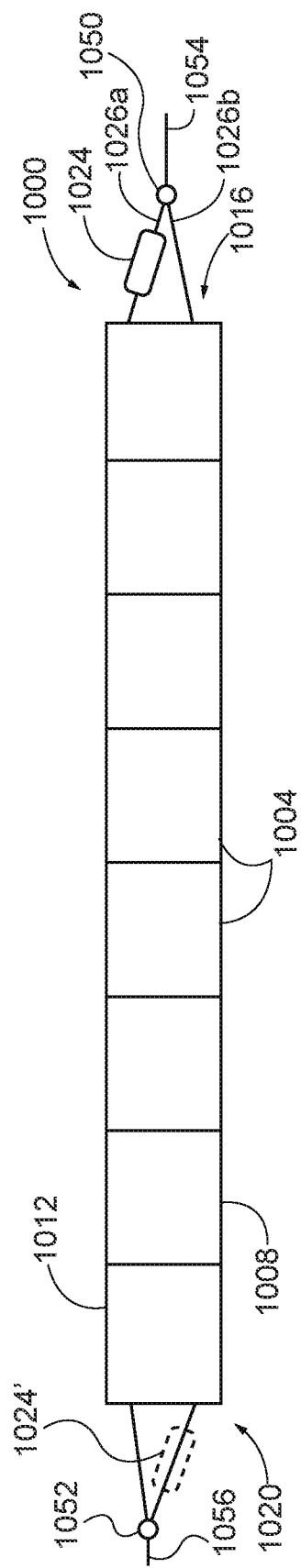
FIG. 10 depicts a schematic illustration of another embodiment of a foil system of the present disclosure.

FIG. 10 depicts a schematic illustration of another embodiment of a foil system of the present disclosure. The foil system 1000 can include a number of foil sections 1004. Each foil section 1004 has a span, a chord, and a foil cross-section, which can be a standard hydrofoil cross-section, such as those described above with respect to FIGS. 5A and 5B, or can be any other desired foil cross-section, such as defined by NACA, Eppler, or Gottingen standards, or any other custom foil cross-section suitable for the desired application, including substantially asymmetrical foil shapes as described above with respect to FIG. 9.

The foil sections 1004 can be arranged or stacked adjacent to one another. In this regard, the foil sections 1004 can be a group of foil sections that collectively define a foil shape. The foil shape can have a leading edge 1012 and a trailing edge 1008. The foil shape of the foil system 1000 can be arranged at a variety of orientations or angles of attack relative to a direction of a fluid flow. This can cause the foil system 1000 to generate lift that is used to manipulate components of a towed marine cable array (e.g., seismic cables, receivers, and so on) in order to steer, move, position, and/or depress the components, as can be appropriate for a given application.

In the embodiments of FIG. 10, the foil sections 1004 are coupled to one another using a pair of through-cables, such as a first through-cable 1026a and a second through-cable 1026b. The first through-cable 1026a and the second through-cable 1026b can extend through the foil sections 1004, thereby supporting the foil sections 1004 within the foil system 1000. As one example, the foil sections 1004 can define ducts or conduits that extend through the foil sections 1004. Any number of ducts can extend along the span of the foil sections within the forward half of the foil profile, with one or more ducts lying on the foil chord line, above the chord line or below the chord line. The aft duct is generally located on the foil chord line, just forward of the foil's trailing edge. In this embodiment, the position of the first through-cable 1026a may be selected before deployment to effect a particular set camber for the foil system 1000. The camber for the foil system 1000 may be changed before any particular deployment by changing the selection of the conduit in the front half of the foil sections 1004 within which the first through-cable 1026a is threaded. The first through-cable 1026a can therefore be positioned within and threaded through any one of the forward ducts and the second through-cable 1026b can therefore be positioned within and threaded through the aft duct of the foil section 1004. In turn, the first through-cable 1026a and the second through-cable 1026b can be coupled to another component or assembly of a towed marine cable array, and thereby help support the foil sections 1004 with the array.

In the embodiment of FIG. 10, the first through-cable 1026a and the second through-cable 1026b can couple the foil sections 1004 to connection points within a towed marine cable array. For example, FIG. 10 shows a first connection point 1050 and a second connection point 1052. The first connection point 1050 and/or the second connection point 1052 can be a hook, a tie, a pulley, a fixed connection, and so on of the towed marine cable array, however, other configurations are possible. The connection points 1050, 1052 can generally define a module of a modular foil system and, as such, other groups of foil sections 1004 can be connected to one another at the connection points 1050, 1052.

Each of the connection points 1050, 1052 can be coupled with distinct connection cables. This can allow the foil system to be coupled to substantially any other cable, rope, assembly and so on of the towed marine cable array, including components of seismic array, a fishing trawl, and so on. For example, FIG. 10 shows a first connection cable 1054 and a second connection cable 1056 that are coupled to respective ones of the connection points 1050, 1052. In turn, the first connection cable 1054 and the second connection cable 1056 can be coupled to other components of the towed marine cable array, according to embodiments described herein.

In the embodiment shown in FIG. 10, the through-cables can converge at the connection points adjacent to opposing ends of the foil sections 1004. For example, the first through-cable 1026a and the second through-cable 1026b can converge toward the first connection 1050. Also, the first through-cable 1026a and the second through-cable 1026b can converge toward the second connection 1052. This can allow for more precise or accurate control of an orientation of the foil sections 1004.

For example, the first through-cable 1026a can extend from the first connection point 1050 to the second connection point 1052. Between the first connection point 1050 and the second connection point 1052, the first through-cable 1026a can extend through a duct of the foil sections 1004 (e.g., a duct defined along and just aft of the leading edge 1012). The second through-cable 1026b can extend from the first connection point 1050 to the second connection point 1052. Between the first connection point 1050 and the second connection point 1052, the second through-cable 1026b can extend through a duct of the foil sections 1004 (e.g., a duct defined along and just forward of the trailing edge 1008).

The position or orientation or catenary of the foil assembly is defined by (or constrained by) the through-cables 1026a, 1026b. For example, the foil assembly (comprised of all of the individual foil sections 1004) can be subjected to hydrodynamic forces and will thus respond and move to find an equilibrium profile and catenary that can articulate from one foil section to the next so that not all foil sections need assume the same angle of attack. However, by acting in unison, the foil assembly will generate a given amount of lift and drag according to the foils' hydrodynamic characteristics. By altering tension in one or both of the cables 1026a, 1026b, the cables 1026a, 1026b will allow the foil assembly to find a new equilibrium profile that can also alter (increase or decrease) the total amount of lift that is generated.

In certain embodiments, the tension can be increased in one or both of the through-cables 1026a, 1026b in order to adjust an angle of attack of the foil shape. As one possibility, a tension increase in the through-cable closest to the leading edge will result in a net decrease in angle of attack, which, in turn, will result in a decrease in the total amount of lift produced by the overall foil assembly. Alternatively, a tension decrease in the forward through-cable will produce an increase in the overall attack angle of the foil assembly. The increased angle of attack can generally cause the foil system 1000 to generate additional lift. As such, the tension of one or both of the through-cables 1026a, 1026b (or any other cables or ropes supporting the foil sections 1004 within the array) can be adjusted in order to manipulate lift generated by the foil system 1000. The total amount of lift generated by the foil assembly will be dependent upon the foil's cross-sectional profile as well as both the tension and location of the forward through-cable that is positioned within the forward half of the foil section.

To facilitate the foregoing, FIG. 10 depicts embodiments in which the first and second through-cables 1026a, 1026b converge at the connection points 1050, 1052, which are adjacent to opposing ends of the foil system 1000. Converging the through-cables 1026a, 1026b toward common connection points 1050, 1052, can allow an actuator to control the tension in one or both of the through-cables 1026a, 1026b in a precise, accurate, and potentially dynamic manner.

In this regard, FIG. 10 shows the foil system 1000 including an actuator 1024. The actuator 1024 can be used to adjust a tension in one or both of the first through-cable 1026a or the second through-cable 1026b, which, in turn, can adjust an angle of attack of a foil shape defined by the foil section 1004. The actuator 1024 is shown in FIG. 10 as coupled to or positioned on the first through-cable 1026a at a first end 1016 of the foil system 1000. Positioning the actuator 1024 on the first through-cable 1026a can help orientate the leading edge 1012 in one or more directions in order to generate a target lift for the foil system 1000. In other cases, actuators can be arranged at various other positions of the foil system 1000, including being positioned on the second through-cable 1026b, for example, as shown with another actuator 1024 (shown in phantom).

The actuator 1024, can be substantially any appropriate component that is used to adjust a tension in a cable, including the first actuator 670 and 680 of FIG. 6, and variations thereof, as described herein. Additionally or alternatively, the actuator can be a mechanical component, such as a turnbuckle. The turnbuckle can be manually adjusted, for example, before deployment of the array, in order to set a desired angle of attack of the foils. Additionally or alternatively, the foil system can include various dynamic actuators, such as a pneumatic or electromechanical controller that is used to modify a tension in the pair of through-cables, for example, as described in U.S. Patent Application Publication No. 20170106946A1. It will be appreciated, however, that other actuators are possible and contemplated with the scope of the present disclosure.

In some cases, the actuator can be configured to adjust a tension of the cable while the array is deployed in a marine environment. For example, the actuator can be configured to receive a signal from another source, such as a vessel towing the array, or another remote source. The actuator can use the signal to adjust a tension in the cable. For example, in a first configuration, the signal can be indicative of a first desired orientation and the actuator can adjust a tension in the through-cable in order for the foil section to match the first desired orientation. Likewise, in another configuration, the signal can be indicative of a second desired orientation and the actuator can adjust a tension in the through-cable in order for the foil section to match the second desired orientation. In this regard, the actuator 1024 can, more broadly, be a component of the adjustment mechanism (e.g., adjustment mechanism 450 of FIG. 4) or other steering or positioning system described herein.

Figure 11:
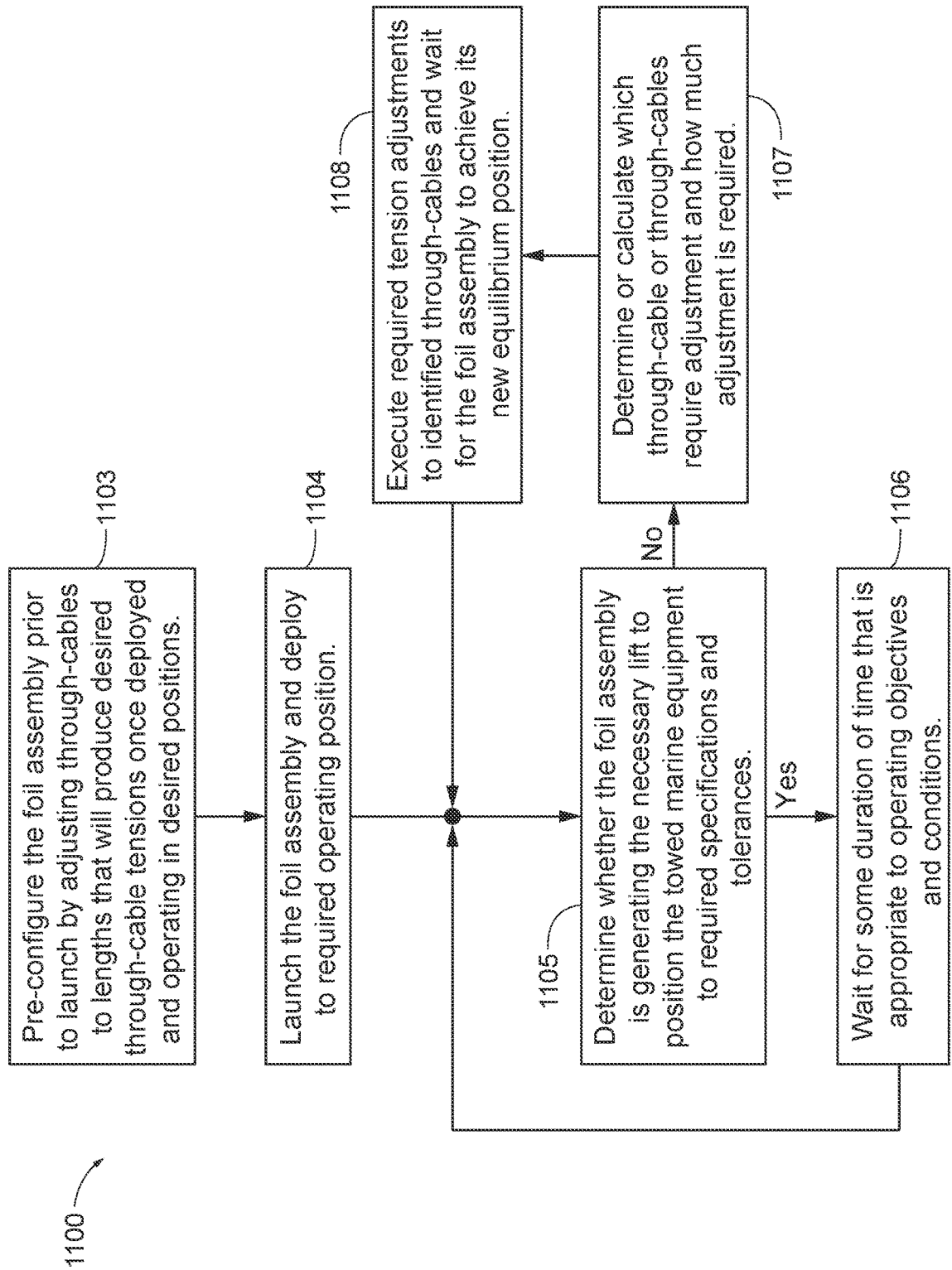
FIG. 11 depicts a flow diagram for a method of positioning a foil system in a mariner array.

To facilitate the readers understanding of the various functionalities of the embodiments discussed herein, reference is now made to the flow diagram in FIG. 11, which illustrates process 1100. While specific steps (and orders of steps) of the methods presented herein have been illustrated and will be discussed, other methods (including more, fewer, or different steps than those illustrated) consistent with the teachings presented herein are also envisioned and encompassed with the present disclosure. In this regard, with reference to FIG. 11, process 1100 can be used with any of the towed marine cable arrays and foil systems described herein.

At operation 1103, before launch, a foil assembly is rigged and configured for deployment with the marine array. Through-conduit lengths are adjusted using best engineering judgement so as to achieve eventual target positions once deployed. At operation 1104, an array is launched into a marine environment. The array can include a cable configured to carry a submerged payload and a foil system coupled to the cable. The foil system includes a group of foil sections that can each define front and back halves and that are connected to one another by a group of through-cables extending therethrough. For example and with reference to FIGS. 5A and 5B, foil sections 504 can each have front halves 506 and back halves 508. The foil section 504 can be connected to one another via the group of through-cables 550.

At operation 1105, measurements are acquired to determine if the array is positioned in the marine environment according to operational objectives, specifications and tolerances. If all positions are within specified tolerances, then execution moves to operation 1106 where an appropriate wait time is assigned before reverting back to operation 1105 for an updated assessment. If an array position is not within specified tolerances, then logic flow moves to operation 1107 where algorithms are used to determine which through-cable or through-cables needs adjustment, and how much of a tension adjustment will be required to bring the array position back within the specified tolerance. Moving then to operation 1108, the necessary tension adjustments are implemented to a first one or more through-cables of the group of through-cables. This tensioning of operation 1108 can define a first rotational constraint of the front halves relative to the back halves, thereby inducing a first angle of attack. For example and with reference to FIGS. 5A, 5B and 6, a first through-cables of the subset of through-cables 554 can be tensioned. One or more actuators, such as the second actuator 680 can apply the tension through the first one of the through-cables to define a rotational constraint of the front halves 606 relative to the back halves 608. This can induce a given angle of attack. For example, where the tensioned through-cable is the first through-cable 554a, the foil section 504 can assume a substantially neutral angle of attack. Further, where the tensioned through-cable is the tensioned through-cable 554b, the foil section 504 can assume a substantially negative angle of attack. Further, where the tensioned through-cable is the third through-cables 554c, the foil section 504 can assume a substantially positive angle of attack.

Operation 1108 includes a wait time interval to allow the array sufficient time to achieve a new equilibrium position. It should be understood that each cycle through operations 1107 and 1108 can include one or more actuators controlling one or more through-cables in one or more modular foil systems. For example and with reference to FIGS. 5A, 5B and 6, a second through-cables of the subset of through-cables 554 can be tensioned. One or more actuators, such as the second actuator 680 can apply the tension through the second one of the through-cables to define a rotational constraint of the front halves 606 of the foil sections 604 relative to the back halves 608. This can induce a given angle of attack. For example, where the tensioned through-cable is the first through-cable 554a, the foil section 504 can assume a substantially neutral angle of attack. Further, where the tensioned through-cable is the tensioned through-cable 554b, the foil section 504 can assume a substantially negative angle of attack. Further, where the tensioned through-cable is the third through-cables 554c, the foil section 504 can assume a substantially positive angle of attack.

With respect to operations 1107 and 1108, a tensioned one of the group of through-cables can be offset from a chord defined between a leading and a trailing edge of any of the foil sections (e.g., second and/or third through-cables 554b, 554). Additionally or alternatively, the tensioned one of the group of through-cables can be substantially in-line with the chord (e.g., first through-cable 554a), as described herein.

Figure 12:
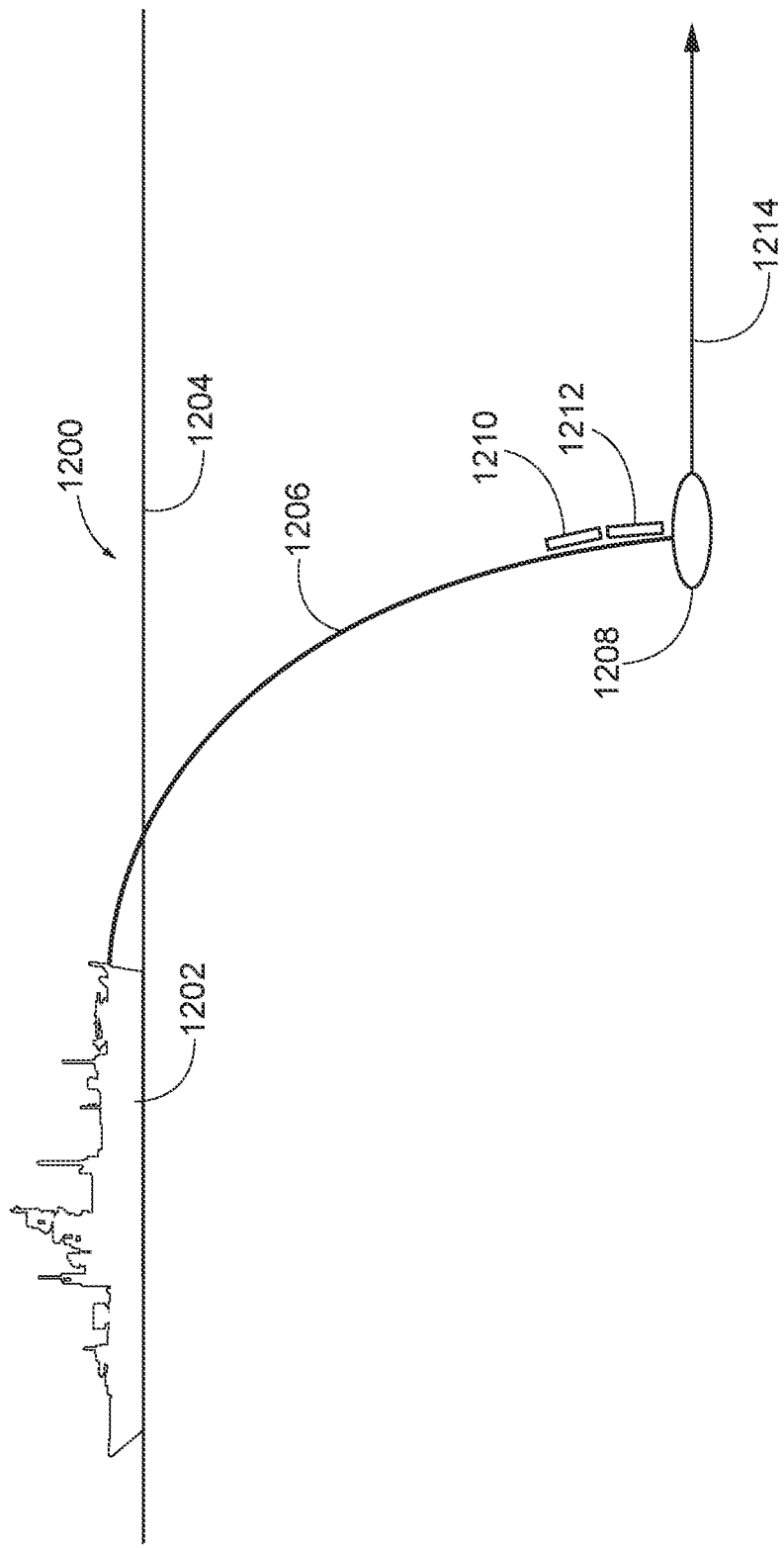
FIG. 12 depicts another embodiment of a towed marine cable array.

FIG. 12 depicts another embodiment of a towed marine cable array. In particular, FIG. 12 shows a towed marine cable array 1200. The towed marine cable array 1200, as within any of the towed marine cable arrays described herein, can be, or be associated with, a seismic array, a fishing trawl, a military application, an oceanographic study, and/or substantially any other maritime application. The embodiment of FIG. 12 shows the towed marine cable array having towed cable and payload that is steered or positioned within a marine environment by a starboard- and a port-biased foil system.

To facilitate the foregoing, the towed marine cable array 1200 includes a vessel 1202. The vessel 1202 is shown positioned along a surface of a marine environment 1204. Attached to the vessel 1202 is a tow cable 1206. The tow cable 1206 can be towed through the marine environment 1204 by the vessel 1202. The tow cable 1206 can carry or pull a towed body or other payload 1208 through the marine environment 1204. In some cases, a streamer cable 1214 can be pulled by the towed body 1208 through the marine environment 1204.

It can be desirable to steer, position, stabilize, and so on the towed body 1208 and associated components within the marine environment 1204. In this regard, FIG. 12 shows the towed marine cable array 1200 including a first foil system 1210 and a second foil system 1212 coupled with the towed cable 1206. The first foil system 1210 and the second foil system 1212 can be substantially analogous to any of the foil systems described herein. As such, the first foil system 1210 and the second foil system 1212 can each include a group of foil sections collectively defining an angle of attack and thus be configured to generate lift.

In one embodiment, the first foil system 1210 can have an angle of attack that causes the first foil system 1210 to generate lift that biases the towed cable 1206 toward a starboard direction. Further, the second foil system 1212 can have an angle of attack that causes the second foil system 1212 to generate lift that biases the towed cable 1206 toward a port direction. In this regard, the first foil system 1210 and the second foil system 1212 can counteract one another and thus help stabilize or otherwise control a position of the towed body 1208 in the marine environment 1204. In some cases, the angle of attack of one or both of the first foil system 1210 or the second foil system 1212 can have an adjustable angle attack, which can be manipulated to help steer the towed body 1208, as can be appropriate for a given application.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A towed marine cable array comprising
a cable configured to be towed by a vessel and carry a submerged payload through a marine environment; and
a foil system coupled with the cable and configured to bias the submerged payload toward a target position, the foil system including a group of foil sections each having a leading edge collectively defining an angle of attack, and a group of through-cables supporting the group of foil sections within the foil system,
wherein a plurality of through-cables of the group of through-cables is:
arranged in same halves of the group of foil sections while at least one different through-cable of the group of through-cables is disposed in different halves of the group of foil sections;
selectively tensionable; and
manipulable to define a tensioned one of the plurality of through-cables as being offset from a chord that is defined between the leading edge and a trailing edge of any of the foil sections.

2. The towed marine cable array of claim 1, further comprising an actuator operatively coupled with the plurality of through-cables and configured to alter a tension in one or more through-cables of the plurality of through-cables.

3. The towed marine cable array of claim 2, wherein the plurality of through-cables is arranged through front halves of the group of foil sections, wherein:
the actuator is a first actuator; and
the marine cable array further comprises a second actuator operatively coupled with the plurality of through-cables and configured to manipulate the tensioned through-cable into an arrangement that rotationally constrains the front halves relative to back halves of the group of foil sections.

4. The towed marine cable array of claim 1, wherein:
the plurality of through-cables comprises a group of leading edge through-cables each extending through front halves of the group of foil sections and along the leading edge; and
the at least one different through-cable is a trailing edge through-cable arranged through back halves of the group of foil sections and along the trailing edge.

5. The towed marine cable array of claim 4, wherein a first leading edge through-cable of the group of leading edge through-cables and the trailing edge through-cable are arranged substantially along the chord.

6. The towed marine cable array of claim 5, wherein a second leading edge through-cable is arranged above the chord; and a third leading edge through-cable is arranged below the chord.

7. The towed marine cable array of claim 6, wherein:
in a first configuration, the tensioned through-cable is the second leading edge through-cable; and
in a second configuration, the tensioned through-cable is the third leading edge through-cable.

8. The towed marine cable array of claim 1, where the plurality of through-cables is arranged through front halves of the group of foil sections, and wherein:
each foil section of the group of foil sections is substantially symmetrical along the chord;
the group of foil sections exhibits a substantially neutral angle of attack when the plurality of cables is in a relaxed state; and
when the tensioned through-cable is offset from the chord, the tensioned through-cable rotationally constrains the front halves relative to back halves of the group of foil sections to define the angle of attack as a positive or negative angle of attack.

9. The towed marine cable array of claim 1, wherein the plurality of through-cables is further manipulatable to define the tensioned through-cable as being along the chord, thereby maintaining the angle of attack as a substantially neutral angle of attack.

10. The towed marine cable array of claim 1, wherein:
the foil system comprises a first modular foil system;
the marine cable array further comprises a second modular foil system, according to the foil system of claim 1; and
the first and second modular foil systems are connected to one another within the marine cable array.

11. The towed marine cable array of claim 10, wherein the group of through-cables of each of the first and second modular foil systems converge toward a connection point arranged substantially between the first and second modular foil systems.

12. The towed marine cable array of claim 10, wherein: the cable is an upper cable;
the marine cable array further includes a lower cable;
the second modular foil system is attached to the lower cable; and
the upper cable and the lower cable cooperate to form a mouth of a fishing trawl.

13. The towed marine cable array of claim 12, wherein the first modular foil system and the second modular foil system are configured to increase a separation distance between the upper cable and the lower cable at the mouth of the fishing trawl.

14. The towed marine cable array of claim 13, wherein the marine cable array further comprises:
a port cable and a starboard cable additionally forming the mouth of the fishing trawl;
a third modular foil system, according to the modular foil system of claim 1, attached to the port cable; and
a fourth modular foil system, according to the modular foil system of claim 1, attached to the starboard cable, wherein the third modular foil system and the fourth modular foil system are configured to laterally spread the port cable and the starboard cable apart.

15. The towed marine cable array of claim 1, wherein the cable is a component of a seismic receiver array.

16. The towed marine cable array of claim 15, wherein the submerged payload includes seismic sources, the seismic sources configured to emit energy into the marine environment.

17. The towed marine cable array of claim 1, wherein: the cable is a separator cable;
the marine cable array further comprises streamer cables configured to be towed behind the separator cable;
the submerged payload includes seismic receivers carried by the streamer cables; and
the angle of attack is configured to maintain the seismic receivers at a desired depth.

18. The towed marine cable array of claim 1, wherein: the cable is a lateral cable of the marine cable array under tension;
the lateral cable includes an end portion positioned along an edge of the marine cable array; and
the foil system is coupled with the lateral cable adjacent to the end portion.

19. The towed marine cable array of claim 18, wherein: the marine cable array further comprises a spur line connected to the end portion of the lateral cable; and
the foil system is connected to the spur line opposite the lateral cable.

20. A foil system for biasing a cable of a towed marine array comprising:
a foil defining a foil shape having a leading edge and trailing edge;
a first through-cable extending through the foil along the leading edge;
a second through-cable extending through the foil along the trailing edge;
a first actuator configured to tension the first through-cable; and
a second actuator configured to move the tensioned first through-cable from an unselected configuration to a selected configuration, wherein:
when in the unselected configuration, the tensioned first through-cable cooperates with the second through-cable to maintain the foil at a substantially neutral angle of attack; and
when in the selected configuration, the tensioned first through-cable cooperates with the second through-cable to maintain the foil at a positive or negative angle attack.

21. The foil system of claim 20, wherein the foil is substantially symmetrical and defines a chord extending between the leading and trailing edges.

22. The foil system of claim 21, wherein the tensioned first through-cable is arranged offset from the chord in the selected configuration.

23. The foil system of claim 22, wherein the second actuator is coupled with the foil and the tensioned first through-cable and is configured to move the tensioned first through-cable from an arrangement substantially along the chord in the unselected configuration to the arrangement offset from the chord in the selected configuration.

24. The foil system of claim 20, wherein the first through-cable is a first leading edge through-cable of a group of leading edge through-cables extending through a front half of the foil and along the leading edge.

25. The foil system of claim 24, wherein the second actuator is configured to define one of the group of leading edge through-cables as the tensioned first through-cable.

26. The foil system of claim 25, wherein:
the second actuator comprises a selector wheel;
each of the group of leading edge through-cables is fixed to the selector wheel at circumferentially spaced positions from one another; and
a rotational position of the selector wheel defines which of the group of leading edge through-cables is the tensioned first through-cable.

27. The foil system of claim 26, wherein the rotational position of the selector wheel is adjustable while the foil system is submerged in a marine environment.

28. The foil system of claim 24, wherein:
the front half of the foil includes a first duct, a second duct, and a third duct, each configured to receive a different leading edge through-cable of the group of leading edge through-cables; and
the foil further defines a back half having a fourth duct configured to receive the second through-cable, each of the first, second, third, and fourth ducts extending completely through a width of the foil and arranged substantially parallel to one another.

29. The foil system of claim 20, wherein the first through-cable and the second through-cable converge toward connection points adjacent to opposing ends of the foil.

30. The foil system of claim 29, wherein each of the connection points is configured to couple a pair of through-cables from another foil system of the towed marine array to the first and second through-cables.

31. A method comprising:
launching an array into a marine environment, the array comprising a cable configured to carry a submerged payload and a foil system coupled to the cable, the foil system including a group of foil sections each defining front and back halves and connected to one another by a group of through-cables extending therethrough;
tensioning a first of one or more through-cables of the group of through-cables to define a first rotational constraint of the front halves relative to the back halves, thereby inducing a first angle of attack; and tensioning a second of the one or more through-cables of the group of through-cables to define a second rotational constraint of the front halves relative to the back halves, thereby inducing a second angle of attack, wherein the first and second through-cables are disposed in the front halves of the group of foil sections, wherein a tensioned one of the group of through-cables during either of the tensioning operations is offset from a chord defined between a leading and a trailing edge of at least one of the foil sections.

32. The method of claim 31 further comprising:
acquiring submerged positional data associated with the foil system; and
determining an adjustment parameter for the foil system by comparing the submerged positional data with an operational target.

33. The method of claim 32, wherein the operation of inducing the first angle of attack or the operation of inducing the second angle of attack is based on the adjustment parameter.

34. The method of claim 33, wherein the foil system further comprises a dynamic actuator configured to cause either of the tensioning operations while the array is submerged in the marine environment using the adjustment parameter.

35. The method of claim 31, wherein one of the first or the second angles of attack is a substantially neutral angle of attack.

36. The method of claim 35, wherein each of the group of foil sections comprises a substantially symmetrical foil.

37. The method of claim 31, wherein:
the group of through-cables comprises a group of leading edge through-cables, each separated from one another and extending through first halves of the group of foil sections along leading edges of the group of foil sections;
one of the tensioning operations defines a first leading edge through-cable of the group of leading edge through-cables as the tensioned one of the group of leading edge through-cables; and
another of the tensioning operations defines a second leading edge through-cable of the group of leading edge through-cables as the tensioned one of the group of leading edge through-cables.

38. The method of claim 37 further comprising tensioning a third of the one or more through-cables, the third leading edge through-cable being arranged substantially along the chord.

39. The method of claim 31, wherein the array is a seismic array.

40. The method of claim 39, wherein the seismic array comprises seismic sources and seismic receivers that cooperate to produce geological data.

* * * * *